(12) United States Patent
Zheng et al.

(10) Patent No.: US 9,501,577 B2
(45) Date of Patent: *Nov. 22, 2016

(54) RECOMMENDING POINTS OF INTERESTS IN A REGION

(71) Applicant: Microsoft Technology Licensing, LLC, Redmond, WA (US)

(72) Inventors: Yu Zheng, Beijing (CN); Chang Sheng, Singapore (CN); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/659,125

(22) Filed: Mar. 16, 2015

(65) Prior Publication Data

US 2015/0186389 A1 Jul. 2, 2015

Related U.S. Application Data

(63) Continuation of application No. 12/567,667, filed on Sep. 25, 2009, now Pat. No. 9,009,177.

(51) Int. Cl.
*G06F 17/30* (2006.01)
*G06F 7/00* (2006.01)

(52) U.S. Cl.
CPC ..... *G06F 17/3087* (2013.01); *G06F 17/30061* (2013.01); *G06F 17/30241* (2013.01);
(Continued)

(58) Field of Classification Search
CPC ............................................. G06F 17/30241
See application file for complete search history.

(56) References Cited

U.S. PATENT DOCUMENTS

| 5,428,546 A | 6/1995 | Shah et al. |
| 5,802,492 A | 9/1998 | DeLorme et al. |

(Continued)

FOREIGN PATENT DOCUMENTS

| EP | 1087605 A2 | 3/2001 |
| GB | 2421653 | 6/2006 |

(Continued)

OTHER PUBLICATIONS

Office action for U.S. Appl. No. 12/794,538, mailed on Mar. 23, 2015, Zheng et al., "Searching Similar Trajectories by Locations", 8 pages.

(Continued)

*Primary Examiner* — Alicia Willoughby
(74) *Attorney, Agent, or Firm* — Steve Wight; Sandy Swain; Micky Minhas

(57) ABSTRACT

Techniques for searching and providing geographical regions are described. The process searches and recommends points of interests based on a user-specified region. Points of interests include spatial objects (e.g., buildings, landmarks, rivers, parks) and their distributions in a geographical region. The process searches and recommends points of interests by partitioning a spatial map into grids to identify representative categories located in each of the grids. In response to the user-specified region, a set of geographical candidates containing the representative categories is retrieved. The process determines whether the user-specified region and the set of geographical candidates include similar or common representative categories and similar or common spatial distributions of the representative categories. Then the process provides the top ranked set of geographical candidates that have similar content information.

20 Claims, 8 Drawing Sheets

(52) U.S. Cl.
CPC ... *G06F17/30327* (2013.01); *G06F 17/30589* (2013.01); *G06F 17/30598* (2013.01); *G06F 17/30622* (2013.01)

(56) References Cited

U.S. PATENT DOCUMENTS

| | | |
|---|---|---|
| 5,845,227 A | 12/1998 | Peterson |
| 5,904,727 A | 5/1999 | Prabhakaran |
| 6,023,241 A | 2/2000 | Clapper |
| 6,091,359 A | 7/2000 | Geier |
| 6,091,956 A | 7/2000 | Hollenberg |
| 6,122,628 A | 9/2000 | Castelli et al. |
| 6,128,279 A | 10/2000 | O'Neil et al. |
| 6,219,662 B1 | 4/2001 | Fuh et al. |
| 6,243,647 B1 | 6/2001 | Berstis et al. |
| 6,317,684 B1 | 11/2001 | Roeseler et al. |
| 6,317,686 B1 | 11/2001 | Ran |
| 6,351,775 B1 | 2/2002 | Yu |
| 6,356,838 B1 | 3/2002 | Paul |
| 6,385,539 B1 | 5/2002 | Wilson et al. |
| 6,411,897 B1 | 6/2002 | Gaspard, II |
| 6,424,370 B1 | 7/2002 | Courtney |
| 6,427,122 B1 | 7/2002 | Lin |
| 6,430,547 B1 | 8/2002 | Busche et al. |
| 6,446,121 B1 | 9/2002 | Shah et al. |
| 6,493,650 B1 | 12/2002 | Rodgers et al. |
| 6,496,814 B1 | 12/2002 | Busche |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,615,130 B2 | 9/2003 | Myr |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| RE38,724 E | 4/2005 | Peterson |
| 6,904,160 B2 | 6/2005 | Burgess |
| 6,919,842 B2 | 7/2005 | Cho |
| 6,925,447 B2 | 8/2005 | McMenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,801,842 B2 | 9/2010 | Dalton |
| 7,840,407 B2 | 11/2010 | Strope et al. |
| 7,860,891 B2 | 12/2010 | Adler et al. |
| 7,904,530 B2 | 3/2011 | Partridge et al. |
| 7,920,965 B1 | 4/2011 | Nesbitt et al. |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,060,462 B2 | 11/2011 | Flinn et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 | 7/2012 | Youssef et al. |
| 8,275,649 B2 | 9/2012 | Zheng et al. |
| 8,458,298 B2 | 6/2013 | Josefsberg et al. |
| 8,562,439 B2 | 10/2013 | Shuman et al. |
| 8,577,380 B2 | 11/2013 | Frias Martinez et al. |
| 2001/0029425 A1 | 10/2001 | Myr |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0075784 A1 | 4/2005 | Gray et al. |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |

(56) References Cited

U.S. PATENT DOCUMENTS

| | | |
|---|---|---|
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1 | 3/2008 | Chapman et al. |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1 | 12/2008 | Lucas et al. |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1 | 1/2009 | Vengroff et al. |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1 | 2/2010 | Higgins et al. |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0176000 A1 | 7/2011 | Budge et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0117713 A1 | 4/2015 | Zheng et al. |

FOREIGN PATENT DOCUMENTS

| | | |
|---|---|---|
| JP | 2002140362 | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A1 | 4/2009 |
| WO | WO2010062726 A2 | 6/2010 |

OTHER PUBLICATIONS

Krumm, et al., "LOCADIO: Inferring Motion and Location from Wi-Fi Signal Strengths", Proceedings of the 1st Annual International Conference on Mobile and Ubiquitous Systems: Networking and Services (MOBIQUITOUS), Boston, MA, Aug. 22-26, 2004, pp. 4-13.

Krumm, et al., "Predestination: Inferring Destinations from Partial Trajectories", Proceedings of the 8th International Conference on Ubiquitous Computing (UbiComp 2006), Orange County, CA, Sep. 17-21, 2006, 18 pages.

Krumm, et al., "Predestination: Where Do You Want to Go Today?", Computer, vol. 40, Issue 4, Apr. 2007, pp. 105-107.

Lafferty, et al., "Conditional Random Fields: Probabilistic Models for Segmenting and Labeling Sequence Data", Proceedings of the 18th International Conference on Machine Learning, Jun. 2001, 8 pages.

Lakhina, et al., Diagnosing Network-Wide Traffic Anomalies, in Proceedings of the SIGCOMM 2004 Conference, 12 pages, Aug. and Sep. 2004 ACM.

Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.

Lee et al, "Efficient Mining of User Behaviors by Temporal Mobile Access Patterns", Intl Journal of Computer Science and Network Security, vol. 7, No. 2, Feb. 2007, 7 pgs.

(56) References Cited

OTHER PUBLICATIONS

Lee, et al., "TraClass: Trajectory Classification Using Hierarchical Region-Based and Trajectory-Based Clustering", Proceedings of the 2008 International Conference on Very Large Data Bases (VLDB'08), Auckland, New Zealand, Aug. 24-30, 2008, 14 pages.

Lee, et al., "Trajectory Clustering: A Partition-and-Group Framework", Proceedings of the 27th ACM SIGMOD International Conference on Management of Data, Beijing, China, Jun. 14, 2007, pp. 593-604.

Lee, et al., "Trajectory Outlier Detection: A Partition-and-Detect Framework", Proceedings of the 24th Internation Conference on Data Engineering (IEEE ICDE), Cancun, Mexico, Apr. 7-12, 2008, pp. 140-149.

Lemire, Maclachlan, "Slope One Predictors for Online Rating-Based Collaborative Filtering", Proceedings of SIAM Data Mining Conference (SDM'05), Orlando, Florida, Jan. 11, 2005, 5 pages.

Li, et al., "A Connectivity-Based Map Matching Algorithm", AARS, Asian Journal of Geoinformatics, Oct. 2005, vol. 5, No. 3, pp. 69-76.

Li, et al., "Mining User Similarity Based on Location History", Proceedings of the 16th ACM SIGSPATIAL International Confernece on Advancesi in Geographic Information Systems, Article 34, Irvine, CA, Nov. 5-7, 2008, 10 pages.

Li, et al., Temporal Outlier Detection in Vehicle Traffic Data, Proceedings of the 2009 IEEE International Conference on Data Engineering, Mar. and Apr. 2009, pp. 1319-1322, <<http://www.cs.uiuc.edu/~hanj/pdf/icde09_xli.pdf>>.

Li, et al., "Traffic Density-Based Discovery of Hot Routes in Road Networks", Springer-Verlag, Advances in Spatial and Temporal Databases, Jul. 2007, pp. 441-459.

Liao, et al., Anomaly Detection in GPS Data Based on Visual Analytics, Proceedings of the 2010 IEEE Symposium, Oct. 2010, pp. 51-58, <<http://web.siat.ac.cn/—baoquan/papers/GPSvas.pdf>>.

Liao, et al., "Building Personal Maps from GPS Data", Annuls of the New York Academy of Sciences, No. 1093, Dec. 2006, pp. 249-265.

Liao, et al., "Learning and Inferring Transportation Routines", Elsevier, Artificial Intelligence, vol. 171, Issues 5-6, Apr. 2007, pp. 311-331.

Liao, et al., "Learning and Inferring Transportation Routines", In the Proceedings of the 19th National Conference on Artificial Intelligence (AAAI), San Jose, CA, Jul. 25-29, 2004, 6 pages.

Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.

Linden et al, "Amazon.com Recommendations, Item to Item Collaborative Filtering", IEEE Internet Computing, Jan. and Feb. 2003, 5 pgs.

Linden, "The End of Federated Search?", at <<http://glinden.blogspot.com/2007/03/end-of-federated-search.html>>, Mar. 24, 2007, pp. 9.

Lippi, et al., Collective Traffic Forecasting, Proceedings of the European Conference on Machine Learning and Principles and Practice of Knowledge Discovery Database, ECML PKDD 2010, pp. 259-273, Sep. 2010.

Liu, et al., Uncovering cabdrivers' behavior patterns from their digital traces, Computers, Environment and Urban Systems, Nov. 2010. pp. 541-548.

Lozano, et al., Spatial-temporal Causal Modeling for Climate Change Attribution, KDD 2009, Paris France, ACM Jun. and Jul. 2009, 10 pages.

Mamoulis, Cao, Kollios, Hadjieleftheriou, Tao, Cheung, "Mining, Indexing, and Querying Historical Spatiotemporal Data", Proceedings of the 10th ACM SIGKDD International Conference on Knowledge Discovery and Data Mining Seattle, WA, Aug. 22, 2004, pp. 236-245.

Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.

Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.

Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.

Matsuo et al, "Inferring Long Term User Properties Based on Users' Location History", Proc 20th Intl Joint Conf on Artificial Intelligence, Jan. 2007, 7 pgs.

McDonald et al, "Expertise Recommender: A Flexible Recommendation System and Architecture", CSCW 2000, Dec. 2000, 10 pgs.

McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), Mar. 1987, pp. 754-763.

Michael et al, "Location Based Intelligence—Modeling Behavior in Humans Using GPS", Proc Intl Symposium on Technology and Society, Jun. 2006, 8 pgs.

Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.

Min-qi, et al., "An Algorithm for Spatial Outlier Detection Based on Delaunay Triangulation", In the Proceedings of the 2008 International Conference on Computational Intelligence and Security, Dec. 2008, pp. 102-107.

Mitchell, et al., "Six in the City: Introducing Real Tournament—A Mobile IPv6 Based Context-Aware Multiplayer Game", NetGames'03, May 2003, pp. 91-100.

Miyaki, et al., "Tracking Persons Using Particle Filter Fusing Visual and Wi-Fi Localizations for Widely Distributed Camera", IEEE Intl Conference on Image Processing (ICIP 2007), vol. 3, San Antonio, TX, Sep. 16-Oct. 19, 2007, vol. 3, 2007, pp. III225-III228.

Monreale, et al., "WhereNext: a Location Predictor on Trajectory Pattern Mining", Proceedings of the 15th ACM SIGKDD Conference on Knowledge Discovery and Data Mining, Paris, France, Jun. 28-Jul. 1, 2009, pp. 637-645.

Morimoto, "Mining Frequent Neighboring Class Sets in Spatial Databases", Proceedings of the 7th ACM SIGKDD Conference on Knowledge Discovery and Data Mining (KDD), San Francisco, CA, Aug. 26-29, 2001.

Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.

Nicholson, "Finding the Shortest Route Between Two Points in a Network", British Computer Society, The Computer Journal, May 1966, vol. 9, No. 3, pp. 275-280.

"North York Moors and Yorkshire Wolds Mountain Bke (MTB) Routes", retrieved on Jan. 17, 2008 from <<http://www.mtb-routs.co.uk/northyorkmorrs/defaultaspx>>, 4 pages.

Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.

Office action for U.S. Appl. No. 12/037,347, mailed on Jan. 13, 2014, Zheng, et al., "System for Logging Life Experiences Using Geographic Cues", 8 pages.

Office action for U.S. Appl. No. 12/712,857, mailed on Feb. 21, 2014, Zheng, et al., "Map-Matching for Low-Sampling-Rate GPS Trajectories", 15 pages.

(56) References Cited

OTHER PUBLICATIONS

Office action for U.S. Appl. No. 12/353,940, mailed on Mar. 4, 2014, Zheng, et al., "Detecting Spatial Outliers in a Location Entity Dataset", 10 pages.
Office Action for U.S. Appl. No. 12/041,599, mailed on Jul. 25, 2011, Arne Josefsberg, "Failover in an Internet Location Coordinate Enhanced Domain Name System", 22 pages.
Office action for U.S. Appl. No. 12/712,857, mailed on Aug. 5, 2013, Zheng, et al., "Map-Matching for Low-Sampling-Rate GPS Trajectories", 15 pages.
Office Action for U.S. Appl. No. 12/037,347, mailed on Aug. 17, 2011, Yu Zheng, "System for Logging Life Experiences Using Geographic Cues", 9 pgs.
Office action for U.S. Appl. No. 12/794,538, mailed on Sep. 18, 2013, Zheng, et al., "Searching Similar Trajectories by Locations", 12 pages.
Yuxiang, et al., Detecting Spatio-temporal Outliers in Climate Dataset: A Method Study, IEEE Geoscience and Remote Sensing Symposium, vol. 2, Jul. 2005, pp. 760-763.
Zhang, et al., "A Taxonomy Framework for Unsupervised Outlier Detection Techniques for Multi-Type Data Sets" Technical Report TR-CTIT-07-79, Centre for Telematics and Information Technology University of Twente, Enschede, Nov. 2007, 40 pgs.
Zhang, Mamoulis, Cheung, Shou, "Fast Mining of Spatial Collocations", Proceedings of the 10th ACM SIGKDD International Conference on Knowledge Discovery and Data Mining, Seattle, WA, Aug. 22-25, 2004, pp. 384-393.
Zhang, et al., iBAT: Detecting Anomalous Taxi Trajectories from GPS Traces, Proceedings of UbiComp Sep. 2011, 10 pages.
Zhang, et al., "Mining Non-Redundant High Order Correlations in Binary Data", International Conference on Very Large Data Bases (VLDB), Aukland, NZ, Aug. 23-28, 2008, pp. 1178-1188.
Zhang, et al., Network Anomography, USENIX Association, Internet Measurement Conference Oct. 2005, pp. 317-330.
Zhang, et al., "Research on Information Fusion on Evaluation of Driver Fatigue", 2008 International Symposium on Computer Scientc and Computational Technology, Dec. 2008, pp. 151-155.
Zhao, et al., "Searching for Interacting Features", Proceedings of the 20th International Joint Conference on Artificial Intelligence, Hyderabad, India, Jan. 6-12, 2007, pp. 1156-1161.
Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.com/pubs/122244/AAAI10-Collaborative%20Filtering%20Meets%20Mobile%20Recommendation%20A%20User-centered%20Approach.pdf>>.
Zheng, et al., GeoLife: A Collaborative Social Networking Service among User, Location and Trajectory. IEEE Date Engineer Bulletin, 33(2). IEEE press Dec. 2010, 32-40, <<http://sites.computer.org/debull/A10june/geolife.pdf>>.
Zheng, Wang, Zhang, Xie, Ma, "GeoLife: Managing and Understanding Your Past Life over Maps", Proceedings of the 9th International Conference on Mobile Data Management, Beijing, China, Apr. 27-30, 2008, pp. 211-212.
Zheng, et al., "GeoLife2.0: A Location-Based Social Networking Service", Proceedings of the 10th International Conference on Mobile Data Management (MDM 2009), Taipei, Taiwan, May 2009, 2 pages.
Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.
Zheng, Liu, Wang, Xie, "Learning Transportation Mode from Raw GPS Data for Geographic Applications on the Web", Proceedings of the 17th International Conference on World Wide Web, Beijing, China, Apr. 21, 2008, pp. 247-256.
Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.
Zheng, et al., "Mining Interesting Locations and Travel Sequences from GPS Trajectories", Proceedings of the 18th International Conference on World Wide Web, Madrid, Spain, Apr. 20-24, 2009, pp. 791-800.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.
Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.
Zheng, et al., T-Drive: Driving Directions based on Taxi Trajectories, In Proc. ACM SIGSPATIAL GIS 2010. ACM Press , Nov. 2010, 10 pages, <<http://www.cse.unt.edu/~huangyan/6350/paperList/T-Drive.pdf>>.
Zheng, Li, Chen, Xie, Ma, "Understanding Mobility Based on GPS Data", ACM Proceedings of Conference on Ubiquitous Computing (UbiComp), vol. 344, Seoul, South Korea, Sep. 21-24, 2008, pp. 312-321.
Ziebart, et al., Navigate like a cabbie: Probabilistic reasoning from observed context-aware behavior. In Proc. Ubicomp Sep. 2008, pp. 322-331, <<http://citeseerx.ist.psu.edu/viewdoc/download?doi=10.1.1.141.7187&rep=rep1&type=pdf>>.
Office action for U.S. Appl. No. 12/712,053, mailed on Mar. 10, 2015, Zheng et al., "Route Computation Based on Route-Oriented Vehicle Trajectories", 22 pages.
Shiraishi, "A User-centric Approach for Interactive Visualization and mapping of Geo-sensor Data", Networked Sensing Systems, 2007, INSS, Fourth International Conference on IEEE, Jun. 1, 2007, pp. 134-137.
Shklovski, et al., Urban Computing-Navigating Space and Context. IEEE Computer Society. 39 ,9, pp. 36-37, Sep. 2006 <<http://www.itu.dk/people/irsh/pubs/UrbanComputingIntro.pd>>.
Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.
Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.
"SlamXR List Routes Page by Microsoft Research Community Technologies Group", retrieved on Jan. 18, 2008 from <<http://www.msslam.com/slamxr/ListRoutes.aspx>, 2 pages.
Sohn, et al., "Mobility Detection Using Everyday GSM Traces" Proceedings of the 8th International Conference of Ubiquitous Computing (UBICOMP), Orange County, CA, Sep. 17-21, 2006, pp. 212-224.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.
"SportsDo", retrieved on Jan. 17, 2008 from <<http://sportsdo.net/Activity/ActivityBlog.aspx>>, 3 pages.
Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.
Strachan, et al., "gpsTunes Controlling Navigation via Audio Feedback", Proceedings of MobileHCI, Sep. 2005, 4 pages.

(56) References Cited

OTHER PUBLICATIONS

Sui, "Decision Support Systems Based on Knowledge Management", Proceedings of the International Conference on Services Systems and Services Management (ICSSSM'05), Jun. 2005, vol. 2, pp. 1153-1156.
Sun, et al., On Local Spatial Outliers, Technical Report No. 549, Jun. 2004, <<http://sydney.edu.au/engineering/it/research/tr/tr549.pdf>>, 9 pages.
Sun, "Outlier Detection in High Dimensional, Spatial and Sequential Data Sets", School of Information Technologies, The University of Sydney, Sep. 2006, 118 pages.
Tai et al., "Recommending Personalized Scenic Itinerary with Geo-Tagged Photos", ICME, Apr. to Jun. 2008, 4 pages.
Takeuchi et al., "City Voyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.
Takeuchi, Sugimoto, "An Outdoor Recommendation System based on User Location History", Proceedings of the 1st International Workshop on Personalized Context Modeling and Management for Ubicomp Applications (ubiPCMM), Tokyo, Japan, Sep. 11, 2005, pp. 91-100.
Taylor, et al., "Virtual Differential GPS & Road Reduction Filtering by Map Matching", In the Proceedings of ION'99, Twelfth International Technical Meeting of the Satellite Division of the Institute of Navigation, Sep. 1999, pp. 1675-1684.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the SDDBM'98, Jul. 1998, 10 pages.
Toyama, et al., "Geographic Location Tags on Digital Images", MM'03, Nov. 2003, 11 pages.
Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.
"Twittervision", retrieved on Jan. 18, 2008 from <<http://twittervision.com>>, 1 page.
Vlachos, Kollios, Gunopulos, "Discovering Similar Multidimensional Trajectories", IEEE Computer Society, Proceedings of Conference on Data Engineering (ICDE), Feb. and Mar. 2002, pp. 673-684.
Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.
Wang, et al., "CLOSET+: Searching for the Best Strategies for Mining Frequent Closed Itemsets", Proceedings of the 9th ACM SIGKDD International Conference on Knowledge Discovery and Data Mining, Washington, DC, Aug. 24-27, 2003, pp. 236-245.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.
Wyatt et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.
Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.
Wasinger, et al., "M3I in a Pedestian Navigation & Exploration System", Proceedings of the Fifth International Symposium on Human Computer Interaction with Mobile Devices, Sep. 2003, 5 pages.
Wei, et al., "A Service-Portlet Based Visual Paradigm for Personalized Convergence of Information Resources", 2nd IEEE International Conference on Computer Science and Information Technology, Aug. 2009, pp. 119-124.
"Weka 3: Data Mining Software in Java", retreived on Jan. 18, 2008 from <<http://www.cs.waikato.ac.nz/ml/weka/index_home.html>>, 1 page.
"Welcome to WalkJogRun", retrieved on Jan. 17, 2008 from <<http://www.walkjogrun.net>>, 1 page.
Weng et al., "Design and Implementation of Spatial-temporal Data Model in Vehicle Monitor-System", Proceeding of the 8th International Conference on Geocomputation, Aug. 3, 2005, pp. 1-8.
Wikipedia, "Operating System", retrived from <<http://en.wikipedia.org/wiki/Operating_system>> on Apr. 29, 2013, 23 pages.
"WikiWalki Community Trail Guide", retrieved on Jan. 17, 2008 from <<http://www.wikiwalki.com>>, 1 page.
Winogard, "Dynamic Cartograms for Navigating Geo-referenced Photographs", available at least as early as Nov. 16, 2007, at <<http://cs.stanford.edu/research/project.php?id=289>>, pp. 2.
Wu, et al., Spatio-Temporal Outlier Detection in Precipitation Data, Knowledge Discovery from Sensor Data, <<http://sydney.edu.au/engineering/it/~ewu1/publications/WuLiuChawlaSensorKDD2008.pdf>>, Second Intl Workshop, Sensor-KDD Aug. 2008, pp. 115-133.
Xiao, Xie, Luo, Ma, "Density Based Co-Location Pattern Discovery", Proceedings of the 16th ACM SIGSPATIAL International Conference on Advances in Geographic Information Systems (SIGSPATIAL), Article 29, Irvine, CA, Nov. 5-7, 2008, 10 pages.
Xie, Zheng, "GeoLife: Building social networks using human location history", retrieved on Apr. 15, 2010 at <<http://research.microsoft.com/en-us/projects/geolife/>>, ACM SIGMOD Conf, Jun. 2010, pp. 1-8.
Xie, "Understanding User Behavior Geospatially", Microsoft Research, Nov. 2008, 2 pgs.
Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.
Yan, et al., "Clospan: Mining Closed Sequential Patterns in Large Datasets", Proceedings of the 2003 SIAM International Conference on Data Mining (SDM'03), San Francisco, CA, May 1-3, 2003, pp. 166-177.
Yan, et al., Discovery of frequent substructures, Wiley-Interscience, Apr. 2006, 99-113.
Yan, et al., "Feature-based Similarity Search in Graph Structures", ACM Transactions on Database Systems, vol. V, No. N, Jun. 2006, 36 pages.
Yavas, et al., "A data mining approach for location prediction in mobile environments", Data & Knowledge Engineering, vol. 54, Issue 2, Aug. 2005, pp. 121-146.
Ye, et al., "Mining Individual Life Pattern Based on Location History," Tenth International Conference on Mobile Data Management: Systems, Services and Middleware, May 18-20, 2009, Taipei, 10 pages.
Yegulalp, Change the Windows 2000 DNS cache, retrieved on Apr. 29, 2008 at <<http://searchwincomputing.techtarget.com/tip/0,289483,sid68_gci1039955,00.html>>, SearchWinComputing.com, pp. 1-3.
Yi, Jagadish, Faloutsos, "Efficient Retrieval of Similar Time Sequences under Time Warping", retrieved on Apr. 15, 2010, IEEE Computer Society, Presentation: Proceedings of Conference on Data Engineering (ICDE), Feb. 1998, pp. 1-15.
Office action for U.S. Appl. No. 13/324,758, mailed on Jan. 18, 2013, Zheng et al., "Urban Computing of Route-Oriented Vehicles", 48 pages.

(56) References Cited

OTHER PUBLICATIONS

Office action for U.S. Appl. No. 12/712,857, mailed on Jan. 6, 2015, Zheng, et al., "Map-Matching for Low-Sampling-Rate GPS Trajectories", 15 pages.
Office action for U.S. Appl. No. 12/711,130, mailed on Oct. 4, 2012, Zheng et al., "Mining Correlation Between Locations Using Location History", 15 pages.
Office action for U.S. Appl. No. 13/188,013, mailed on Nov. 15, 2011, Josefsberg et al., "Internet Location Coordinate Enhanced Domain Name System", 14 pages.
Office action for U.S. Appl. No. 12/353,940, mailed on Nov. 2, 2012, Zheng et al., "Detecting Spatial Outliers in a Location Entity Dataset", 11 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Office action for U.S. Appl. No. 12/794,538, mailed on Nov. 29, 2011, Zheng et al. "Searching Similar Trajectories by Locations", 10 pages.
Office action for U.S. Appl. No. 12/567,667, mailed on Dec. 19, 2011, Zheng et al., "Recommending Points of Interests in a Region", 18 pages.
Office Action for U.S. Appl. No. 13/324,758, mailed on Dec. 24, 2014, Zheng et al., "Urban Computing of Route-Oriented Vehicles", 54 pages.
Office Action for U.S. Appl. No. 12/562,588, mailed on Dec. 8, 2011, Yu Zheng, "Mining Life Pattern Based on Location History", 31 pgs.
Office action for U.S. Appl. No. 12/567,667, mailed on Feb. 25, 2014, Zheng et al., "Recommending Points of Interests in a Region", 31 pages.
Office action for U.S. Appl. No. 12/353,940, mailed on Feb. 28, 2013, Zheng et al., "Detecting Spatial Outliers in a Location Entity Dataset", 9 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/773,771, mailed on Mar. 26, 2012, Yu Zheng, "Collaborative Location and Activity Recommendations", 9 pgs.
Office Action for U.S. Appl. No. 12/711,130, mailed on Mar. 27, 2012, Yu Zheng, "Mining Correlation Between Locations Using Location History", 14 pgs.
Office action for U.S. Appl. No. 12/794,538, mailed on Apr. 22, 2014, Zheng et al., "Searching Similar Trajectories by Locations", 38 pages.
Non-Final Office Action for U.S. Appl. No. 12/041,608, mailed on Jun. 25, 2014, Josefsberg, et al., "Client-Side Management of Domain Name Information", 4 pages.
Office Action for U.S. Appl. No. 12/712,857, mailed on Jun. 6, 2014, Yu Zheng, "Map-Matching for Low-Sampling-Rate GPS Trajectories", 14 pages.
Office action for U.S. Appl. No. 12/712,053, mailed on Jun. 6, 2014, Zheng et al., "Route Computation Based on Route-Oriented Vehicle Trajectories", 24 pages.
Office action for U.S. Appl. No. 13/324,758, mailed on Jul. 11, 2013, Zheng et al., "Urban Computing of Route-Oriented Vehicles", 47 pages.
Office Action for U.S. Appl. No. 12/353,940, mailed on Jul. 17, 2014, Yu Zheng, "Detecting Spatial Outliers in a Location Entity Dataset", 10 pages.
Office action for U.S. Appl. No. 12/567,667, mailed on Jul. 18, 2012, Zheng et al., "Recommending Points of Interests in a Region", 20 pages.

Office action for U.S. Appl. No. 12/712,053, mailed on Aug. 15, 2012, Zheng et al., "Route Computation Based on Route-Oriented Vehicle Trajectories", 17 pages.
Final Office Action for U.S. Appl. No. 12/567,667, mailed on Aug. 27, 2014, Yu Zheng, "Recommending Points of Interests in a Region", 7 pages.
Office action for U.S. Appl. No. 12/041,599, mailed on Sep. 21, 2012, Josefsberg et al., "Failover in an Internet Location Coordinate Enhanced Domain Name System", 9 pages.
Park, et al., CoDNS: Improving DNS Performance and Reliability via Cooperative Lookups, retrieved at <<http://www.cs.princeton.edu/nsg/papers/codns_osdi_04/paper.pdf>>, Princeton University, pp. 1-16, Proceedings of the 6th conference on Symposium on Opearting Systems Design & Implementation, Dec. 2004.
Park et al., "Location-Based Recommendation System Using Bayesian User's Preference Model in Mobile Devices", J. Indulska et al. (Eds.): UIC 2007, LNCS 4611, pp. 1130-1139, retrieved on Aug. 30, 2010 at <<http://sclab.yonsel.ac.kr/publications/paper/IC/UIC07-MHPark.pdf>>.
Patterson, et al., "Inferring High-Level Behavior from Low-Level Sensors", Proceedings of the 5th International Conference on Ubiquitous Computing (UBICOMP 2003), Seattle, WA, Oct. 12-15, 2003, 18 pages.
Pelekis, et al., Unsupervised Trajectory Sampling, Proceedings of the European Conference on Machine Learning and Principles and Practice of Knowledge Discovery in Databases ECML PKDD 2010, pp. 17-33, Sep. 2010.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.
Pfoser, et al., "Capturing the Uncertainty of Moving-Object Representations", Springer-Verlag, In the Proceedings of the 6th International Symposium on Advances in Spatial Databases, Lecture Notes in Computer Science, Jul. 1999, vol. 1651, pp. 111-131.
Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.
Quddus, et al."Current Map-Matching Algorithms for Transport Applications: State-of-the-Art and Future Research Directions", Elsevier Ltd., Transportation Research Part C: Emerging Technologies, Oct. 2007, vol. 15, Issue 5, pp. 312-328.
Rekimoto, et al., "LifeTag: WiFi-based Continuous Location Logging for Life Pattern Analysis", Proceedings of the 3rd International Symposium on Location-and-Context-Awarness (LOCA2007), Oberpfaffenhofen, Germany, Sep. 20-21, 2007, pp. 35-49.
Ringberg, et al., Sensitivity of PCA for Traffic Anomaly Detection, SIGMETRICS 2007, pp. 109-120, Jun. 2007.
Rosenfeld, Connectivity in digital pictures. Journal of the ACM (JACM), 17(1), Jan. 1970, pp. 146-160.
Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, SIGMOD, May 1995, pp. 1-23.
Saltenis, "Outlier Detection Based on the Distribution of Distances between Data Points", retrieved on Dec. 12, 2008 at <<http://www.mii.lt/informatica/pdf/INFO558.pdf>>, INFORMATICA, vol. 15, No. 3, Jan. 2004, pp. 399-410.
Salton, et al., "A Vector Space Model for Automatic Indexing", Communications of the ACM, vol. 187, No. 11, Nov. 1975, pp. 613-620.
Salton, "Dynamic Document Processing", Communications of the ACM, vol. 15, Issue 7, Jul. 1972, pp. 658-668.
Sarwar et al, "Application of Dimensionality Reduction in Recommender System, A Case Study", ACM WebKDD Workshop, Aug. 2000, 12 pgs.
Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.
Schonfelder, "Between Routines and Variety Seeking: The Characteristics of Locational Choice in Daily Travel", retrieved on Dec. 12,

(56) References Cited

OTHER PUBLICATIONS 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", Proceedings of the SIGCHI conference on Human factors in computing systems, Apr. and May 2007, pp. 10.

"Share My Routes", retrieved on Apr. 15, 2010 at <<http://www.sharemyroutes.com/>>, 2010, pp. 1-2.

Shekhar et al., "A Unified Approach to Detecting Spatial Outliers", GeoInformatica 7:2, Jun. 2003, 28 pages.

Shekhar, et al., "Data Mining for Selective Visualization of Large Spatial Datasets", In the Proceedings of the 14th IEEE International Conference on Tools with Artificial Intelligence, Nov. 2002, pp. 41-48.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.

Adomavicius, Tuzhilin, "Toward the Next Generation of Recommender Systems: A Survey of the State-of-the-Art and Possible Extensions", IEEE Transactions on Knowledge and Data Engineering, vol. 17, No. 6, Jun. 2005, pp. 734-749.

Agrawal, et al., "Mining Association Rules between Sets of Items in Large Databases", Proceedings of the 1993 ACM SIGMOD Conference, Washington, DC, May 1993, 10 pages.

Agrawal, et al., "Mining Sequential Patterns", Proceedings of the 11th International Conference on Data Engineering, Taipei, Taiwan, Mar. 6-10, 1995, pp. 3-14.

Ahern, et al., "World Explorer: Visualizing Aggregate Data From Unstructured Text in Geo-Referenced Collections", In the Proceedings of the 7th ACM/IEEE-CS Joint Conference on Digital Libraries, Jun. 2007, pp. 1-10.

Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.

Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).

Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, Sep. 2007, pp. 50.

Amato, et al., "Region Based Image Similarity Search Inspired by Text Search", Third Italian Research Conference on Digital Library Systems, Padova, Italy, Jan. 29-30, 2007, pp. 78-85.

Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.

Ashbrook,et al., "Using GPS to Learn Significant Locations and Predict Movement Across Multiple Users", Journal of Personal and Ubiquitous Computer Archive, vol. 7, Issue 5, Oct. 2003, 15 pages.

Belussi, et al, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), Sep. 1995, pp. 299-310.

"Bikely Reviews", Bile Trails, Paths & Routes website, 2010, 1 page, retrieved on Apr. 16, 2010 at <<http://www.bikely.com/>>.

bing.com, Maps, Retrieved on Dec. 28, 2009 at <<http://cn.bing.com/ditu/>>, 2 pgs.

Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, Jun. 2000, pp. 1-43.

Borzsonyi, et al., The Skyline Operator, In Proc. ICDE 2001, IEEE Press: 421-430, <<http://ieeexplore.ieee.org/stamp/stamp.jsp?tp=&arnumber=914855>>, Apr. 2001.

Brakatsoulas, et al., "On Map-Matching Vehicle Tracking Data", VLDB Endowment, In the Proceedings of the 31st International Conference on Very Large Data Bases, Sep. 2005, pp. 853-864.

Brauckhoff, et al., Applying PCA for Traffic Anomaly Detection: Problems and Solutions, IEEE, Apr. 2009, 5 pages.

Breiman, "Bagging Pedictors", Machine Learning, vol. 24, No. 2, Aug. 1996, pp. 123-140.

Brkic, et al., Generative modeling of spatio-temporal traffic sign trajectories, Proceedings of the IEEE Conference on Computer Vision and Pattern Recognition, Jun. 2010, pp. 25-31, <<http://www.zemris.fer.hr/~ssegvic/pubs/brkic10ucvp.pdf>>.

Brunato, Battiti, "A Location-Dependent Recommender System for the Web", MobEA Workshop, Budapest, May 2003, pp. 1-5.

Bu, et al., Efficient Anomaly Monitoring Over Moving Object Trajectory Streams, KDD Jun. and Jul. 2009, ACM, 9 pages.

Cai, "Indexing Spatio-Temporal Trajectories with Chebyshev Polynomials", retrieved on Apr. 15, 2010 at <<http://www.cs.ubc.ca/~mg/psdepository/sigmod2004.pdf>>, ACM, Conference on Management of Data, Jun. 13-18, 2004, pp. 599-610.

Cao, et al., "Mining Frequent Spatio-temporal Sequential Patterns", Proceedings of the 5th IEEE International Conference on Data Mining (ICDM '05), Houston, TX, Nov. 27-30, 2005, pp. 82-89.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chawathe, "Segment-Based Map Matching", In the Proceedings of the IEEE Intelligent Vehicles Symposium, Jun. 13-15, 2007, pp. 1190-1197.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

Chen, et al., "GeoTracker Geospatial and Temporal RSS Navigation", WWW2007, May 2007, pp. 41-50.

Chen, et al., GLS-SOD: A Generalized Local Statistical Approach for Spatial Outlier Detection, Proceedings of KDD 2010, ACM, Jul. 2010, pp. 1069-1078.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp-norms+and+edit+distance&ei=_ezGS62IE439__Aa1qlzZDA&usg=AFQjCNHFZScVkE4uy1b_oC-Pr4ur7KlBdQ>>, Proceedings of Conference on Very Large Data Bases (VLDB), Aug. 29-Sep. 3, 2004, pp. 792-803.

Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.

Chen et al., "Searching Trajectories by Locations—An Efficiency Study", 2010 Microsoft Research, to be presented at the ACM Conference on Management of Data (SIGMOD), Indianapolis,

(56) References Cited

OTHER PUBLICATIONS

Indiana, Jun. 6-11, 2010, 12 pages, retrieved on Apr. 16, 2010 at <<http://www.itee.uq.edu.au/~zxf/_papers/sigmod299-chen.pdf>>.
Cranshaw, et al., Bridging the Gap between the Physical Location and Online Social Networks, In Proc. Ubicomp Sep. 2010, ACM Press, <<http://www.eng.tau.ac.il/~eran/papers/Cranshaw_Bridging_the_Gap.pdf>>.
"CRF++: Yet Another CRF Toolkit", retrieved on Jan. 18, 2008 from <<http://crfpp.sourceforge.net>>, 13 pages.
Das, et al., Anomaly Detection and Spatial-Temporal Analysis of Global Climate System, Proceedings of SensorKDD Jun. and Jul. 2009, 9 pages, ACM.
Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.
Domain Name System (DNS), retrieved on Apr. 29, 2008 at <<http://www.unix.org.ua/orelly/networking/firewall/ch08_10.htm>>, Unix, pp. 1-11.
Domain Name System (DNS) A Guide to TCP/IP, Version date: Sep. 20, 2005, retrieved at <<http://web.syr.edu/~djmolta/ist452/ch_07.ppt>>, Thomson Learning Course Technology, pp. 1-56.
Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.
Eagle, et al., Community Computing: Comparisons between Rural and Urban Societies using Mobile Phone Data, IEEE Social Computing, Aug. 2009, 144-150, <<http://reality.media.mit.edu/pdfs/Eagle_community.pdf>>.
Eagle et al, "Reality mining: sensing complex social systems", Springer-Verlag London, Personal and Ubiquitous Computing, vol. 10, Issue 4, Mar. 2006, pp. 255-268.
European Search Report mailed Nov. 21, 2012 for European patent application No. 09714738.3, 9 pages.
European Search Report mailed Jun. 8, 2012 for European patent application No. 09715263.01, 6 pages.
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Estkowski, No Steiner Point Subdivision Simplification is NP-Complete, In Proceedings of the 10th Canadian Conference on Computational Geometry, pp. 11-20, Aug. 1998.
Eustice et al, "The Smart Party: A Personalized Location Aware Multimedia Experience", Consumer Communications and Networking Conf, Jan. 2008, 5 pgs.
Faloutsos et al, "Fast Subsequence Matching in Time-Series Databases," Proceedings of the 1994 ACM SIGMOD International Conference on Management of Data , vol. 23, No. 2, Jun. 1994, 11 pgs.
"Flow Control Platform (FCP) Solutions", at <<http://k2colocation.com/network-services/fcp.cfm>>, K2 Colocation, retrieved on Jul. 5, 2007, 2 pages.
Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.
Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.
Ge et al., "An Energy-Efficient Mobile Recommender System", KDD'10, Jul. 25-28, 2010, 9 pages.
Ge, et al., TOP-EYE: Top-k Evolving Trajectory Outlier Detection, Proceedings of CIKM Oct. 2010, Toronto, Canada, 4 pages.
Giannotti, et al., "Efficient Mining of Temporally Annotated Sequences", Proceedings of the 6th SIAM International Conference on Data Mining, Bethesda, MD, Apr. 20-22, 2006, pp. 346-357.
Giannotti, et al., "Trajectory Pattern Mining", Proceedings of the 13th ACM SIGKDD International Conference on Knowledge Discovery and Data Mining, San Jose, CA, Aug. 12-15, 2007, pp. 330-339.
"Global Server Load Balancing for Disaster Recovery, Business Continuity, Performance Optimization and Datacenter Management", retried on Mar. 15, 2013 at <<http://www.zeus.com/documents/en/ZXT/ZXTM_Global_Load_Balancer.pdf>>, Zeus Technology Limited, 1995-2007, pp. 4.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
Gonzalez, Hidalgo, Barabasi, "Understanding individual human mobility patterns Supplementary Material", Nature, vol. 453, Jun. 2008, pp. 779-782.
GPS Sharing, retrieved Feb. 4, 2013 at http://web.archive.org/web/20071129224158/http://gpssharing.com, 2 pgs.
"GPS Track Route Exchange Forum", 2010 GPSXchange.com website, 3 pages, retrieved on Apr. 16, 2010 at <<http://www.gpsxchange.com/phpBB2/index.php>>.
"GPS-Waypoints", retrieved on Apr. 15, 2010 at <<http://www.gps-waypoints.net/>>, 2010, pp. 1.
Graham, "GPS Gadgets Can Reveal More Than Your Location", Retrieved on Nov. 28, 2011 at <<http://www.google.com/#sclient=psy-ab&hl=en&source=hp&
q=Graham%2C+GPS+Gadgets+Can+Reveal+More+Than+
Your+Location&pbx=1&
oq=Graham%2C+GPS+Gadgets+Can+Reveal+More+Than+
Your+Location%22%2C+&aq=f&aqi=&aql=&gs_sm=d&gs_
upl=287016708l0l1014012l2l0l0l0l0l266l4338l0.1.1l2l0&bav=on.
2,or.r_gc.r_pw.,cf.osb&fp=533a712cc6ce8ba0&biw=1280&
bih=808, 2008, pp. 1-2.
Greenfeld, "Matching GPS Observations to Locations on a Digital Map", In the Proceedings of the 81st Annual Meeting of the Transportation Research Board, Washington DC, Jan. 2002, 13 pgs.
Guehnemann, et al., Monitoring traffic and emissions by floating car data. Institute of transport studies Australia; Mar. 2004, <<http://elib.dlr.de/6675/1/its_wp_04-07.pdf>>.
Gustavsen, "Condor—an application framework for mobility-based context-aware applications", UBIComp 2002 Workshop, Gothenburg, Sweden. Sep. 29, 2009, 6 pages, retrieved on Aug. 4, 2009 at <<http://www.comp.lancs.ac.uk/~dixa/conf/ubicomp2002-models/pdf/Gustavsen-goteborg%20sept-02.pdf>>.
Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&
url=http%3A%2F%2Fciteseerx.ist.psu.
edu%2Fviewdoc%2Fdownload%3Fdoi%3D10.1.1.66.
1675%26rep%3Drep1%26type%3Dpdf&rct=j&q=R-
trees%3A+a+dynamic+index+structure+for+spatial+searching&
ei=JfTGS6uRPJH0_AaCpICHDQ&
usg=AFQjCNFtQttNVHCKYJQZcH052-KmCxlZ0g>>, ACM, Proceedings of Conference on Management of Data, Jun. 1984, pp. 47-57.

(56) References Cited

OTHER PUBLICATIONS

Hadjieleftheriou, et al., "Complex Spatio-Temporal Pattern Queries", Proceedings of the 31st VLDB Conference, Sep. 2005, pp. 877-888.

Hadjieleftheriou, et al., "Efficient Indexing of Spatiotemporal Objects", Proceedings of the 8th International Conference on Extending Database Technology: Advances in Database Technology, Mar. 2002, 10 pages.

Han, et al., "Frequent pattern mining: current status and future directions", Data Min. Knowl. Disc., vol. 15, Aug. 2007, pp. 55-86.

Han, et al., "Predicting User' Movement with a Combination of Self-Organizing Map and Markov Model", ICANN 2006, Part II, LNCS 4132, Sep. 2006, pp. 884-893.

Hariharan et al, "NetTrust—Recommendation System for Embedding Trust in a Virtual Realm", ACM Recommender Systems, Oct. 2007, 6 pgs.

Hariharan, et al., "Project Lachesis: Parsing and Modeling Location Histories", ACM, In the Proceedings of GIScience, Oct. 2004, pp. 106-124.

Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.

Hirose, et al., Network Anomaly Detection based on Eigen Equation Compression, In Proceedings of the 15th SIGKDD Conference on Knowledge Discovery and Data Mining, pp. 1185-1194, Jun. and Jul. 2009 ACM. <<http://www.ibis.t.u-tokyo.ac.jp/yamanishi/ID361_Network_Anomaly_Detection.pdf>>.

Hjaltason, Samet, "Distance Browsing in Spatial Databases", retrieved on Apr. 15, 2010 at <<http://citeseerx.ist.psu.edu/viewdocklownload?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, Shekhar, Xiong, "Discovering Co-location Patterns from Spatial Datasets: A General Approach", IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu~joh/csci8715/P6.pdf>>, Computer Science Department, University of Minnesota, Apr. 2004, pp. 1-8.

International Preliminary Report on Patentability cited in PCT Application No. PCT/US2009/032777 dated Sep. 10, 2010, 6 pages.

Intl Search Report for PCT/US2009/063023, mailed Jun. 10, 2010, 4 pgs.

Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.

International Search Report and Written Opinion Received for PCT Application No. PCT/US2009/0327777, mailed Aug. 26, 2009, 10 pages.

International Search Report and Written Opinion dated Aug. 19, 2009 for PCT Application No. PCT/US2009,032778, filed Jan. 31, 2009, 11 pages.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Jarvelin et al, "Cumulated Gain Based Evaluation of IR Techniques", ACM Transactions on Information Systems, vol. 20, No. 4, Oct. 2002, 25 pgs.

Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, Nov. 1996, pp. 261-268.

Jones et al., "P3 Systems: Putting the Place Back into Social Networks", IEEE Internet Computing, Sep.-Oct. 2005, 9 pgs.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde_06fastestpath.pdf<<, IEEE Computer Society, Proceedings of Conference on Data Engineering (ICDE), Apr. 2006, pp. 1-10.

Kavouras, et al., "A Method for the Formalization and Integration of Geographic Categorizations", Draft version from the International Journal of Geographic Information Science, vol. 16, No. 5, Jul. 2002, pp. 439-453.

Ke, et al., "Correlated Pattern Mining in Quantitative Databases", ACM Transactions on Database Systems, vol. V, No. N, Apr. 2008, 44 pages.

Ke, et al., "Efficient Correlations Search from Graph Databases", IEEE Transactions on Knowledge and Data Engineering, vol. 20, Issue 12, Dec. 2008, pp. 1601-1615.

Kharrat, Popa, Zeitouni, Faiz, "Clustering Algorithm for Network Constraint Trajectories", retrieved on Apr. 15, 2010 at <<http://www.prism.uvsg.fr/~karima/papers/SDH_08.pdf>>, Springer Berlin, Symposium on Spatial Data Handling (SDH), Jul. 2008, pp. 631-647.

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439 &userType=inst>>.

Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Kou, et al., "Spatial Weighted Outlier Detection", retrieved on Dec. 12, 2008 at <<http://www.siam.org/proceedings/datamining/2006/dm06_072kouy/pdf>>, SIAM Conference on Data Mining, Apr. 2006, pp. 614-618.

Office Action for U.S. Appl. No. 13/324,758, mailed on Jun. 17, 2015, Zheng et al., "Urban Computing of Route-Oriented Vehicles", 38 pages.

Office Action for U.S. Appl. No. 12/712,857, mailed on Jun. 25, 2015, Zheng et al., "Map-Matching for Low-Sampling-Rate GPS Trajectories", 17 pages.

Office action for U.S. Appl. No. 12/794,538, mailed on Aug. 14, 2015, Zheng et al., "Searching Similar Trajectories by Locations", 10 pages.

Final Office Action for U.S. Appl. No. 12/712,857, mailed on Oct. 7, 2015, Yu Zheng, "Map-Matching for Low-Sampling-Rate GPS Trajectories", 18 pages.

Office action for U.S. Appl. No. 13/324,758, mailed on Feb. 26, 2016, Zheng et al., "Urban Computing of Route-Oriented Vehicles", 32 pages.

Office action for U.S. Appl. No. 12/794,538, mailed on Mar. 2, 2016, Zheng et al., "Searching Similar Trajectories by Locations", 10 pages.

Agarwal, et al., "Geometric Approximation via Coresets," Combinatorial and Computational Geometry, MSRI Publications, vol. 52, 2005, 30 pages.

Agrawal, et al., "Efficient Similarity Search In Sequent Databases," IBM Almaden Research Center, San Jose, California, 4th International Conference, Oct. 1993, 15 pages.

Blandford, Rafe, "Looking at Lifeblog," retrieved at <<http://www.allaboutsymbian.com/features/item/Looking_at_Lifeblog.php>>, Oct. 18, 2004, 14 pages.

Carter, et al., "When Participants Do the Capturing: The Role of Media in Diary Studies," CHI 2005: 899-908, 10 pages.

(56) References Cited

OTHER PUBLICATIONS

Chakka, et al., "Indexing Large Trajectory Data Sets With SETI*," Procedings of the 2003 CIDR Conference, pp. 1-12.
Dumas, et al., "Stuff I've Seen: A System for Personal Information Retrieval and Re-Use," SIGIR, Aug. 1, 2003, pp. 1-8.
Flickr, http://www.flickr.com/, 1 pages.
Freeman, Eric, "Lifestreams: A Storage Model for Personal Data," SIGMOD Record, vol. 25, No. 1, Mar. 1996, pp. 80-86.
Fu, et al., "Heuristic shortest path algorithms for transportation applications: State of the art," Science Direct, Computers & Operations Research 33 (2006) 3324-3343, available May 3, 2005; pp. 3324-3343.
Geek Magazine, "Lifelog: DARPA looking to record lives of interested parties," retrieved at <<http://www.geek.com/news/lifelog-darpa-looking-to-record-lives-of-interested-parties-552879/>>, retrieved on Sep. 23, 2013, published on Jun. 3, 2003, 4 pages.
Gemmell, et al., "MyLifeBits: A Personal Database for Everything," Microsoft Bay Area Research Center, MSR-TR-2006-23, Feb. 20, 2006, pp. 1-18.
GeoLife GPS Trajectories, <<http://research.microsoft.com/en-us/downloads/b16d359d-d164-469e-9fd4-daa38f2b2e13/default.aspx.
Hadjieleftheriou, et al., "Indexing Spatio-temporal Archives," Proceedings of Extending Database Technology 2002, pp. 1-22.
Hanlin, Mike, "Nokia Lifeblog is an automated multimedia diary," retrieved at <<http://www.gizmag.com/go/2729/>>, Jun. 4, 2004, 5 pages.
International Preliminary Report on Patentability for PCT Application No. PCT/US2009/032778, mailed on Aug. 31, 2010.
International Search Report and the Written Opinion for PCT Application No. PCT/US2009/032778, mailed on Aug. 19, 2009, 11 pgs.
Kim et al., "A Spatiotemporal Data and Indexing," Proceedings of IEEE Region 10 International Conference eon Electrical and Electronic Technology, Singapore, Aug. 19-22, 2001, pp. 110-113.
Klemmer, et al., "Where Do Web Sites Come From? Capturing and Interacting with Design History," CHI, Contextual Displays Paper, Apr. 20-25, 2002, vol. 4, No. 1, pp. 1-8.
Kollios, et al., "Indexing Animated Objects USing Spatiotemporal Access Methods," A TimeCenter Technical Report, TR-54, Jan. 25, 2001, pp. 1-32.
Kolovson et al., "Segment Indexes: Dynamic Indexing Techniques for Multi-Dimensional Internval Data," Proceedings of the ACM SIGMOD Conference on Management of Data, 1991, pp. 138-147, 10 pages.
Kuhne et al., "New Approaches for Traffic Management in Metropolitan Areas," In 10th IFAC Symposium on Control in Transportation Systems, Aug. 2003, 9 pages.
Kumar, et al., "Approximate Minimum Enclosing Balls in High Dimensions Using Core-Sets," Journal of Experimental Algorithmics (JEA), vol. 8, 2003, Artl. No. 1.1, pp. 1-29.
Kumar, et al., "Designing Access Methods for Bitemporal Databases," IEEE Trans. Knowl. Data Eng., 1998, pp. 1-41.
Lou, et al., "Map-Matching for Low-Sampling-Rate GPS Trajectories," ACM GIS '09, ISBN 978-1-60558-649, Nov. 4-6, 2009, pp. 1-10.
Mead, Nick, "Lifeblog 2.5," retrieved at <<http://lifeblog.en.softonic.com/symbian>>, Feb. 25, 2008, 2 pages.
Mountain Bike. http://www.myb-tracks.co.uk/northyorkmoors/default.aspx, retrieved Jan. 18, 2008, 2 pages.
Nascimento, et al., "Evaluation of Access Structures for Discretely Moving Points", Proceedings of the International Workshop on Spatio-Temporal Database Management, Sep. 1, 1998, State Univ. of Campinas, Brazel, 18 pp.
Nascimento et al., "Towards historical R-trees," Proc. of the ACM Symp. on Applied Computing, SAC, pp. 235-240, Feb. 1998, 6 pages.
Notice to File Corrected Application Papers U.S. Appl. No. 12/794,538, mailed on Mar. 11, 2010, Zheng et al. "Mining Correlation Between Locations Using Location History", 2 pages.
Office Action for U.S. Appl. No. 13/195,496, mailed on Oct. 21, 2011, Yu Zheng, "Learning Transportation Modes from Raw GPS Data", 7 pages.

Office Action for U.S. Appl. No. 12/037,263, mailed on Oct. 8, 2010, Longhao Wang, "Indexing Large-Scale GPS Tracks", 7 pages.
Office Action for U.S. Appl. No. 13/195,496, mailed on Feb. 7, 2012, Yu Zheng, "Learning Transportation Modes from Raw GPS Data", 7 pages.
Office Action for U.S. Appl. No. 12/037,347, mailed on Mar. 1, 2011, Zheng, et al., System For Logging Life Experiences Using Geographic Cues, 18 pages.
Office Action for U.S. Appl. No. 12/037,263, mailed on Mar. 29, 2011, Longhao Wang, "Indexing Large-Scale GPS Tracks", 8 pages.
Office Action for U.S. Appl. No. 12/712,857, mailed on May 20, 2016, Yu Zheng, "Map-Matching for Low-Sampling-Rate GPS Trajectories", 14 pages.
Office Action for EP Patent Application No. 09 715 263.1, mailed on Feb. 16, 2015, "Learning Transportation Modes from Raw GPS Data", 5 pages.
Office Action mailed Oct. 9, 2015 for European Patent Application No. 09 715 263.1.
Papadopoulos et al., "Performance of Nearest Neighbor Queries in R-Tree", In ICDT, 1997, pp. 394-408.
Rao et al., "Making B+-tree Cache Sensitive in Main Memory," Proceedings of ACM SIGMOD Conference, 2000, pp. 475-486, 12 pages.
Salzberg et al., "Comparison of Access Methods for Time-Evolving Data", ACM Computing Surveys, 31(2), 1999, pp. 158-221, 64 pages.
Shachtman, Noah, "A Spy Machine of DARPA's Dreams," retrieved at <<http://archive.wired.com/techbiz/media/news/2003/05/58909?currentPage=all>>, Wired, May 20, 2003, 1 page.
Shachtman, Noah, "Pentagon Kills Lifelog Project," retrieved at <<http://www.wired.com/2004/02/pentagon-kills-lifelog-project/>>, Wired, Feb. 4, 2004, 6 pages.
Song et al., "Hashing Moving Objects," Proceedings of 2nd International Conference of Mobile Data Management, 2001, pp. 1-31.
Song et al., "SEB-tree: An Approach to Index Continuously Moving Objects," Proceedings of International Conference of Mobile Data Management, pp. 340-344, Jan. 2003.
Supplemental EP Search Report App. No. 09713700.4 mailed Jul. 17, 2012, 9 pages.
Tao et al., "MV3R-Tree: A Spatio-Temporal Access Method for Timestamp and Interval Queries," Proceedings of the International Conference on Very Large Data Bases, 2001, 10 pages.
Theodoridis et al., "On the Generation of Spatiotemporal Datasets," Advanced in Spatial Databases, 6th International Symposium, Lecture Notes in Computer Science, Springer, 1999, 19 pages.
Wang et al., "A Flexible Spatio-Temporal Indexing Sceme for Large-Scale GPS Track Retrieval," MDM '08 9th International Conference on Mobile Data Management, IEEE, Beijing, 8 pages.
Weeks, Darren, "Lifelog: Because Big Brother Cares What You're Thinking," retrieved at <<http://www.sweetliberty.org/issues/privacy/lifelog.htm>> on Dec. 3, 2005, Big Brother, 5 pages.
Wikipedia, "DARPA Lifelog," retrieved at <<https://en.wikipedia.org/wiki/DARPA_Lifelog>>, Dec. 14, 2013, 1 page.
Wikipedia, "Nokia Lifeblog", retrieved at <<https://en.wikipedia.org/wiki/Nokia_Lifeblog>>, on Feb. 26, 2008, 2 pages.
Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.
Xu et al., "RT-Tree: An Improved R-Tree Indexing Structure for Temporal Spatial Databases," Proc. of the Intl. Symp. on Spatial Data Handling, SDH, pp. 1040-1049, Jul. 1990, 5 pages.
Yuan et al., "An Interactive-Voting Based Map Matching Algorithm," In IEEE Conference on Mobile Data Management (MDM), 2010, 10 pages.
Zheng, et al., "Collaborative Location and Activity Recommendations with GPS History Data," Proceedings of the 19th International Conference on World Wide Web, 2010, pp. 1029-1038.
Zheng et al., "Cross-domain Activity Recognition," In Proc. Of the 11th International Conference on Ubiquitous Computing (Orlando, USA, 2009), ACM Press, pp. 61-70.
Zheng et al., "Understanding Transportation Modes Based on GPS Data for Web Applications," ACM Transactions on the Web, 4(1):1-36, 2010.
Zhou et al., "Close Pair Queries in Moving Object Databases," Proceedings of ACM GIS, pp. 2-11, 2005, 10 pages.

RECOMMENDING POINTS OF INTERESTS IN A REGION

CROSS REFERENCE TO RELATED APPLICATIONS

This is a continuation application which claims priority to commonly assigned, co-pending U.S. patent application Ser. No. 12/567,667, filed Sep. 25, 2009. Application Ser. No. 12/567,667 is fully incorporated herein by reference.

BACKGROUND

A wide range of traditional information retrieval is being offered to users by service providers or search engines. The traditional information retrieval services offered may allow a user to provide a set of keywords or terms to a search engine. In return, the search engine provides a list of items that are relevant to the keywords or the terms by retrieving text documents.

A problem that occurs with the traditional information retrieval, however, is when the user wants to find particular locations by representative categories in a geographical region. For example, the user travelling in a new city may have limited knowledge about the area. Since the user may also have limited time, it is highly desirable to find locations with a desired mixture of local sights and/or attractions to visit during this limited time.

Another problem with the traditional information retrieval is that it does not help identify geographical regions that may be considered potential high-risk areas prone to outbreak of diseases. Thus, the problem is not able to identify the high-risk areas to alert a traveler to avoid that geographical region.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes geographical recommendation services that, for example, searches and recommends points of interests based on a user-specified region. Points of interests include spatial objects (e.g., buildings, landmarks, rivers, parks) and their distributions in a geographical region. The process searches for points of interests by partitioning a spatial map into grids to identify representative categories located in each of the grids. In response to the user-specified region, a set of geographical candidates containing the representative categories is retrieved. The process determines whether the user-specified region and the set of geographical candidates include similar representative categories and spatial distributions of the representative categories. Then the process recommends the top ranked geographical candidates that have similar content information to the user-specified region.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
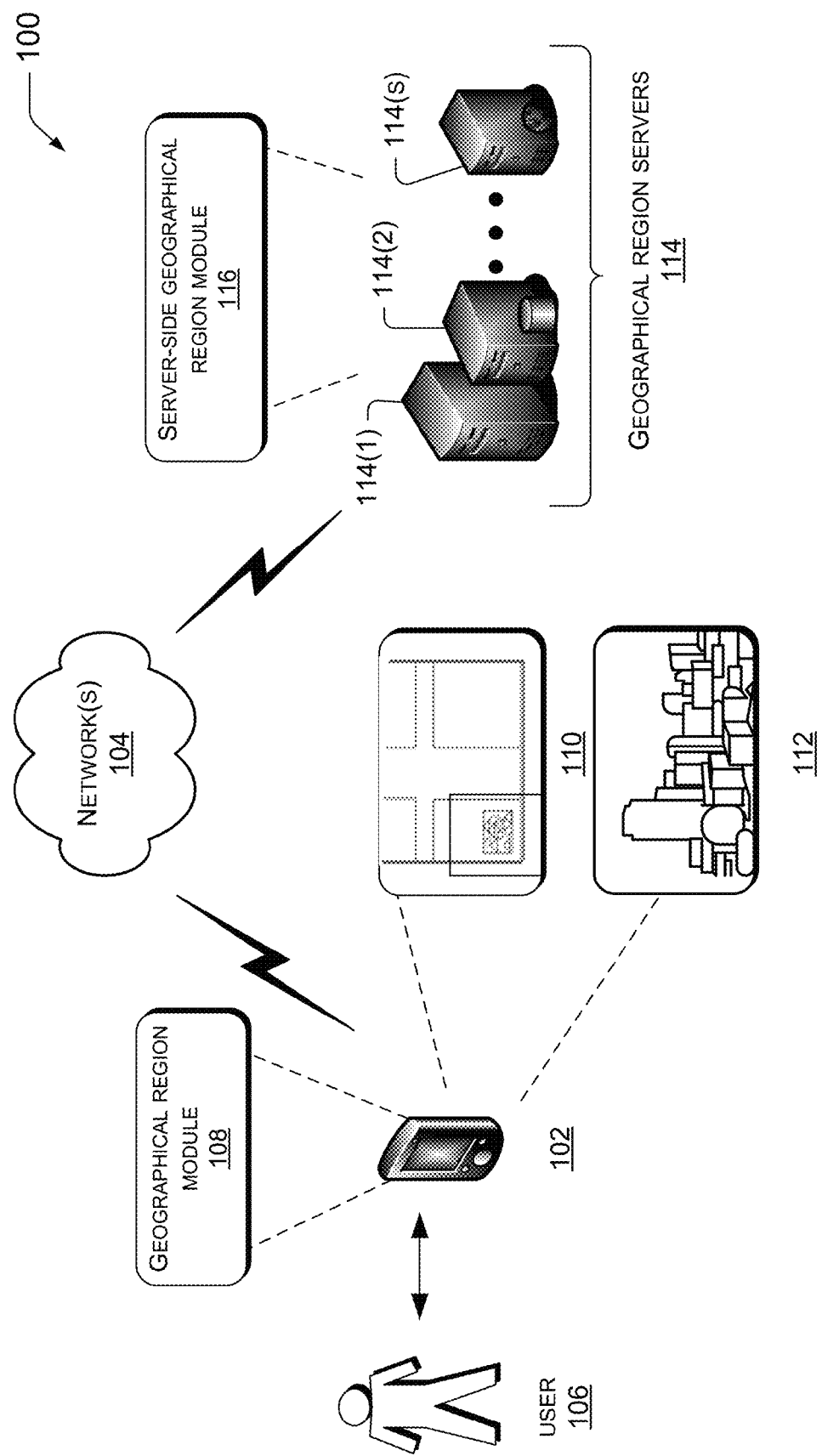
FIG. 1 is a schematic showing an illustrative environment for searching and recommending points of interests in a geographical region.

As discussed above, conventional services or search engines may not always provide an effective way of searching regions that are similar in content information to a region specified by the user. For example, in some instances, it may be difficult to identify how to measure similarities in content information between the regions. Moreover, conventional services or search engines may not be able to readily incorporate the distribution of the representative categories while trying to measure similarities between the regions. This disclosure describes various illustrative ways of searching to recommend geographical regions that are similar to a user-specified region or a query region on a spatial map. For example, by determining whether the user-specified region and a set of geographical candidates have similar content information including common geometric properties, common representative categories, and common spatial distributions of representative categories. The process provides the top ranked geographical regions from the set of geographical candidates, that have similar content information to the user-specified region. Thus, the techniques described in detail below provide ways to search and to recommend points of interests in regions that are similar to the user-specified region.

In an implementation, the techniques for searching and recommending similar regions employ a spatial vector space model. The vector space model measures similarity by analyzing whether the user-specified region and a candidate region have a significant overlap in their representative categories and whether the points of interests of the common representative categories among these two regions have a similar spatial distribution. The vector space model evaluates the similarity of the two regions by analyzing a cosine similarity of corresponding feature vectors of the two regions. Furthermore, to minimize the effects of scaling and to allow for rotation invariant, two new features capture the spatial distribution of points of interests: mutual distance vector or reference distance vector.

In another implementation, the techniques employ a quadtree-based heuristic region search approach. The quadtree process partitions the spatial map into a hierarchical structure and builds a quadtree structure for quick retrieval of points of interests in a region. For instance, the process uses these index structures to perform region search queries efficiently. Given the user-specified region, the process analyzes a shape and a size of the user-specified region and determines an appropriate quadtree layer to initiate a similar region search process. At the same time, the process may compute values for an inverse region frequency of category to derive the representative categories of the user-specified region. Next, a prune-and-refine process quickly reduces the search space that is unlikely to be in the top most similar regions.

While aspects of described techniques can be implemented in any number of different computing systems, environments, and/or configurations, implementations are described in the context of the following illustrative computing environment.

Illustrative Environment

FIG. 1 is a block diagram of an illustrative environment 100 in which the service provider or service engine searches and recommends geographic regions with similar points of interests (POIs). Points of interests may include spatial objects (e.g., buildings, landmarks, rivers, parks) in representative categories and their distributions in a geographical region. While representative categories include but are not limited to, restaurants, hotels, shopping malls, museums, theatres, golf courses, bowling alleys, landmarks, and the like.

The environment 100 includes an illustrative computing device 102, which may take a variety of forms, including, but not limited to, a desktop computer, a portable handheld computing device (e.g., a personal digital assistant, a smart phone, a cellular phone), a thin client, a laptop computer, a media player, or any other device capable of connecting to one or more network(s) 104 to access network services, a network service provider, a web site, web entity, and the like. A user 106 may employ the illustrative computing device 102 to connect to the one or more network(s) 104.

The one or more network(s) 104 represents any type of communications network(s), including multiple different types of networks, interconnected with each other and functioning as a single large network (e.g., the Internet or an intranet). The network 104 may include wire-based networks (e.g., cable), wireless networks (e.g., cellular, satellite, etc.), cellular telecommunications network(s), and IP-based telecommunications network(s) (e.g., Voice over Internet Protocol networks). The network 104 may use any number of protocols and configurations to enable the computing device 102 to access other devices, content, information, and resources.

The computing device 102 may include a geographical region module 108 to implement searching for geographic regions with similar POIs to the user-specified region, that may be accessed on the computing device 102. In some implementations, this geographical region module 108 may be available as part of the web browser, may be incorporated into a search engine, or may be available as an application on the computing device 102. In particular, the geographical region module 108 searches and provides recommendations of regions with similar POIs to the query region specified by the user 106. The terms user-specified region and query region are used interchangeably to refer to the region that the user 106 specifies.

The user-specified region may be a place the user has visited, a place the user would like to visit, or a place the computing device specifies based at least in part on the user's present location as a center of a certain window size. In an implementation, the user 106 may draw a rectangle around the query region at the place he or she is visiting on the spatial map. Thus, the region identified in this rectangle is the query region 110 or the user-specified region 110, such as a shopping mall. Shown is an example of a set of candidates that may be in a geographical region 112.

Unlike a traditional text query that searches based on keywords, the geographical region module 108 finds the top most similar regions to the user-specified region using an algorithm. The algorithm identifies a set of candidates in the regions if there is similar content information of the POIs in the regions. The algorithm evaluates whether the POIs in the query region 110 and the set of candidates 112 have similarities that are measured by geometric properties, content properties, and spatial properties. The similarity measures look for common geometric properties (i.e., scales, shapes, sizes), common content properties (i.e., POIs categories, representative categories), and common spatial properties (i.e., distribution of POIs of representative categories, reference points). The algorithm performs the search promptly to provide the top candidates. In the illustrated example, the top regions 112 with similar POIs may be presented to the user 106 on a spatial map, as an enlarged view, or as a list.

The environment 100 may include one or more web site servers 114(1), 114(2), . . . , 114(S) which may be a representative set of servers that is accessible via the network(s) 104. The geographical region servers 114 may be independent servers, or a collection of servers that are configured to perform larger scale functions (e.g., a server farm or a datacenter), or a set of servers configured to host one or more sites (e.g., web sites) accessible by the network 104. In the illustrated example, the servers 114 may represent private servers that serve content and programming to the computing device 102, the thin client, and the like. Alternatively, the servers 114(1)-114(S) may represent a wireless services provider that provides content to wireless devices. In still other implementations, the servers 114(1)-114(S) may be configured to host a service provider, such as a web site accessible by the computing device 102 via the Internet.

These various arrangements exhibit examples of environments where a server-side geographical region module 116 may be employed. In the illustrated example shown in FIG. 1, the user 106 operates the computing device 102 to connect via the network(s) 104 to the servers 114. In this example, the geographical region module 108 is capable of receiving a list of candidates for geographical regions of similar POIs to the user-specified region. Thus, the geographical region module 108 process identifies regions with similar POIs in response to the user-specified region and provides the top geographical recommendations, as identified by the user 106.

In another implementation, a server-side geographical region module 116 may be located on the geographical server 114 or may be part of an operating system browser on the server accessible by a computing device. In some instances, the geographical region module on the computing device may be executed with a server-side geographical region module to provide recommendations of geographical regions with similar POIs to the user-specified region.

Figure 2:
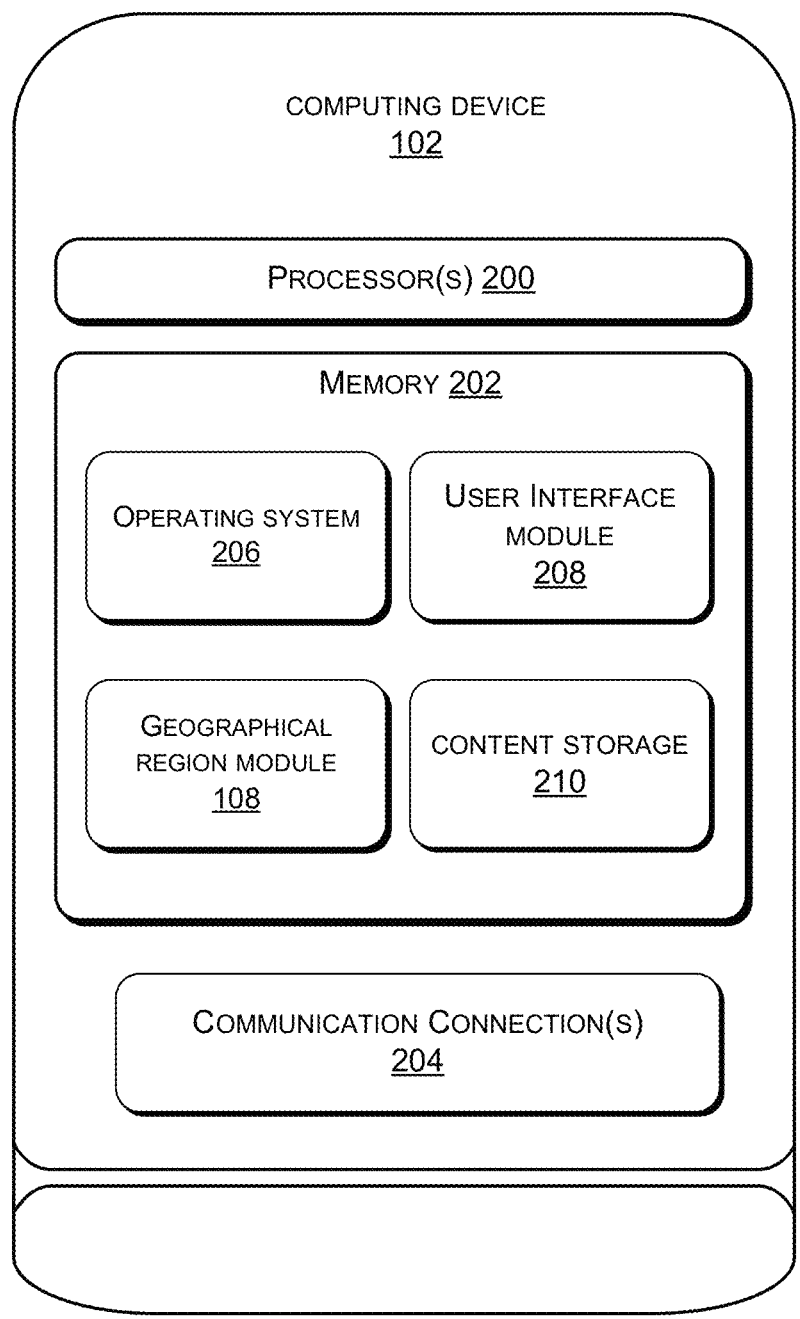
FIG. 2 is a block diagram showing an illustrative computing device usable with the environment of FIG. 1.

FIG. 2 is a block diagram showing an exemplary communication device, such as the computing device 102. As shown, the computing device 102 includes a processor 200, a memory 202, and one or more communication connections 204. The communication connection(s) 204 may include a wide area network (WAN) module, a local area network module (e.g., WiFi), a personal area network module (e.g., Bluetooth), and/or any other suitable communication modules to allow the computing device 102 to communicate over the network(s) 104. For example, the recommendations for the geographical regions with POIs may be delivered by the browser, sent to others through email, shared in text messaging, shared in instant messaging, or the like.

The memory 202 may also include an operating system 206 and a user interface (UI) module 208 that, when executed on the processor 200, collectively facilitate presentation of a user interface on a display of the computing device 102. The user interface module 208 may provide a visual representation of the spatial map, where the user 106 may draw a rectangle in one color (e.g., red color) to specify the query region 110. For example, by providing a visual representation to the user 106 confirms the query region 110 selected may include the representative categories that are desired. This provides assurance to the user 106 when receiving the top recommendations for the geographical regions with POIs, that are similar to the user-specified region 110. In an implementation, the similar geographical regions with POIs may be displayed with a second color (e.g., blue color). Thus, the user 106 may visually confirm there are similar representative categories and similar spatial distribution of POIs to the query region.

Furthermore, the user interface module 208 of the computing device 102 may, in some implementations, visually present a list of the top geographical regions with POIs identified. This visual representation of a list allows the user 106 to visually verify that the representative categories have been identified for the geographical regions. For example, the list may describe Region Candidate 1 that includes restaurants, shopping malls, and theatres with their addresses, while Region Candidate 2 includes restaurants and hotels with their addresses. Thus, the user may quickly scan the list to select a region.

Furthermore, the computing device 102 may visually present the geographical regions with POIs in a representation with geographical coordinates, such as streets and highways. By visually illustrating what and where the representative categories are, helps the user 106 know what representative categories are available and where the representative categories are located. For example, the user 106 may be travelling in New York City, wants to find a restaurant close to a theatre. The user 106 may draw a rectangle around restaurants or theatres on a certain street located in Manhattan, representing the categories of the user-specified region 110. In response, the geographical region module 108 in operation with the user interface module 208 provides and displays the top recommendations of geographical regions with POIs that are similar to the user-specified query 110. The top recommended geographical regions may be shown with rectangles around the regions in different colors. For example, in an implementation, the rectangles may be based on colors ranging in order of rank.

The memory 202 may include a content storage 210 for locally storing representative categories of points of interests on the spatial map. The content stored may include representative categories identified through: spatial objects, published telephone listings, zip codes, city information, graphical representation of the set of geographical coordinates, and the like. Some of the information may include business entities, each having their own properties of name, category, and GPS coordinate. Storing the representative categories of points of interests in the content storage 210 offers the user 106 accessibility to the content, if there is no network service available. As mentioned, the servers 114 may host some or all of the content, such as the spatial maps, applications, and may store some or all of the content, based on the network service provider.

The computing device 102 as described above may be implemented in various types of systems or networks. For example, the computing device may be a part of, including but is not limited to, a client-server system, a peer-to-peer computer network, a distributed network, an enterprise architecture, a local area network, a wide area network, a virtual private network, a storage area network, and the like.

Figure 3:
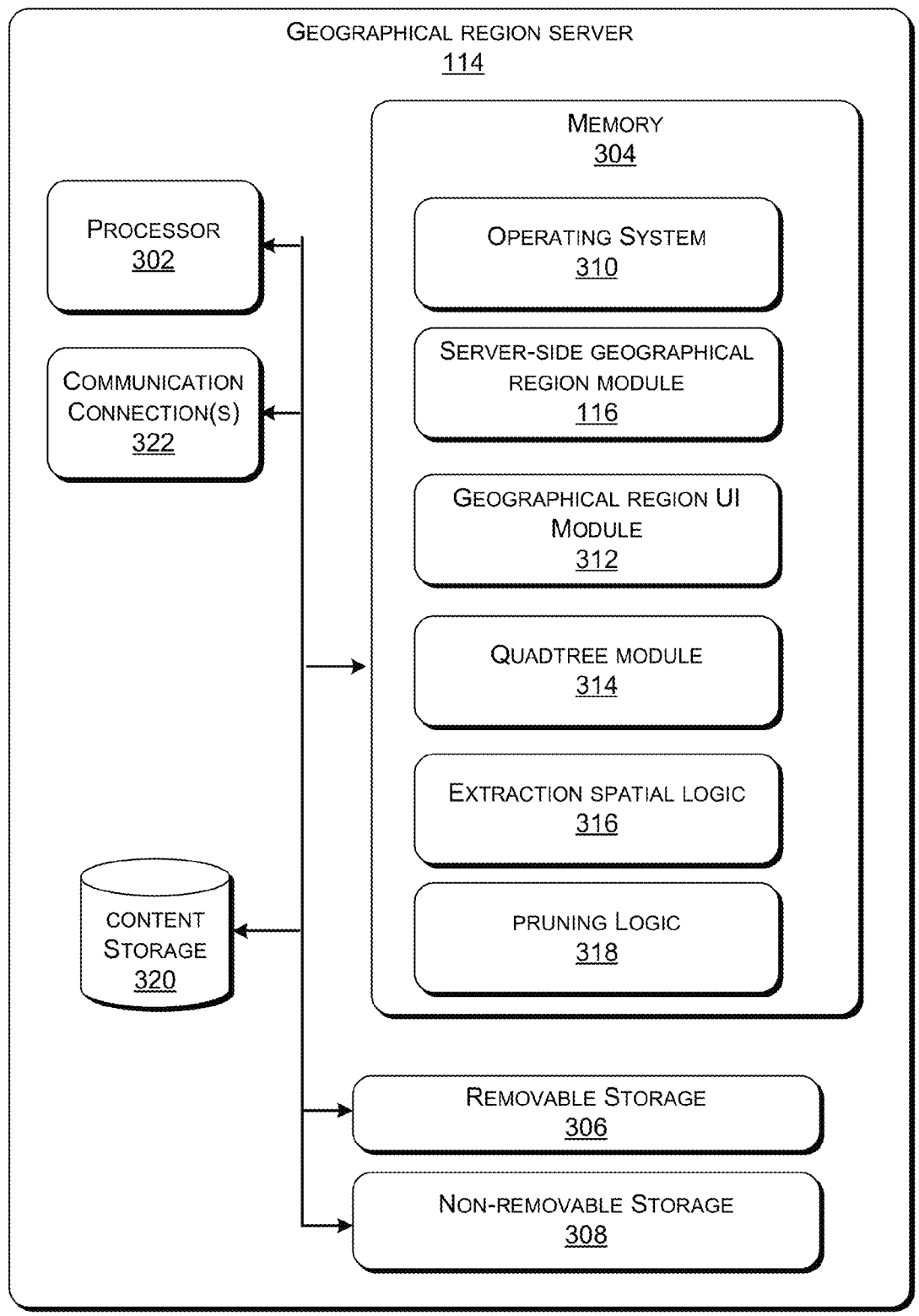
FIG. 3 is a block diagram showing an illustrative server usable with the environment of FIG. 1.

FIG. 3 is a schematic block diagram showing details of an exemplary geographical region server 114. The geographical region server 114 may be configured as any suitable system capable of searching and providing recommendations for geographical regions with POIs similar to the user-specified region, which includes, but is not limited to, searching, receiving, storing, detecting, sharing, removing, and updating the content. In one exemplary configuration, the geographical region server 114 includes at least one processor 302 and a memory 304. The geographical region server 116 may also include additional removable storage 306 and/or non-removable storage 308.

Turning to the contents of the memory 304 in more detail, the memory 304 may store an operating system 310, the server-side geographical region module 116, a geographical region user interface module 312, and one or more applications for implementing all or a part of the searching geographical region services. The geographical region user interface module 312 facilitates a representation of the geographical regions with POIs similar to the user-specified query region on a display of a user interface to receive selections from the user 106. The server-side geographical region module 114 and the geographical region UI module 312 may be stored on the geographical region server 114, in addition to or instead of the individual computing device 102.

The memory 304 in this implementation may also include a quadtree module 314, an extraction spatial logic 316, a pruning logic 318, a content storage 320, and a communication connection(s) 322.

The quadtree module 314 provides a heuristic region search approach. The quadtree module 314 partitions the spatial map into a hierarchical structure and builds a quadtree structure for quick retrieval of POIs. The quadtree module 314 uses the index structures to perform region search queries efficiently. Given a user-specified query, the process analyzes a shape and a size of the user-specified region and determines an appropriate quadtree layer to initiate the similar region search process. A detailed discussion of the quadtree follows in FIG. 4 with an illustration in FIG. 7.

Once the starting level of the quadtree and the representative categories of the region are known, a prune-and-refine procedure occurs to remove the search space that is unlikely to be in the top-K most similar regions. The extraction spatial logic 316 extracts the representative categories from the search region. Occurring about the same time as the quadtree module 314 interacting, the extraction spatial logic 316 may compute category frequency values for each category on the user-specified query region and may maintain the top-m categories with the largest category frequency values.

The pruning logic 318 works in conjunction with the quadtree module 314. The pruning logic 318 effectively prunes the region by storing key statistical information at each node in the quadtree structure. Each node maintains a lower bound and an upper bound which are useful for pruning the candidate regions by the pruning logic 318.

The content storage 320 provides suitable storage options for the content based at least in part on storing representative categories for points of interests on the spatial map. The content stored may include representative categories identified through: spatial objects, published telephone listings, zip codes, city information, graphical representation of the set of geographical coordinates, and the like. The content storage 320 may also manage storage options for the content, such as the content from the computing device 102, the content stored in the content storage 210, and the content stored in the server-side content storage 320.

The server 114 may also contain communications connection(s) 322 that allow the processor 302 to communicate with the computing device 102, other network servers, network storage, and/or other devices on the network(s) 104. The server 114 may also include one or more known input device(s), such as a keyboard, mouse, pen, voice input device, touch input device, etc., and output device(s), such as a display, speakers, printer, etc. All these devices are well known in the art and are not discussed at length here.

Any memory described herein may include volatile memory (such as RAM), nonvolatile memory, removable memory, and/or non-removable memory, implemented in any method or technology for storage of information, such as computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The geographical region server as described above may be implemented in various types of systems or networks. For example, the geographical region server may be a part of, including but is not limited to, a client-server system, a peer-to-peer computer network, a distributed network, an enterprise architecture, a local area network, a wide area network, a virtual private network, a storage area network, and the like.

Illustrative Processes

Figure 4:
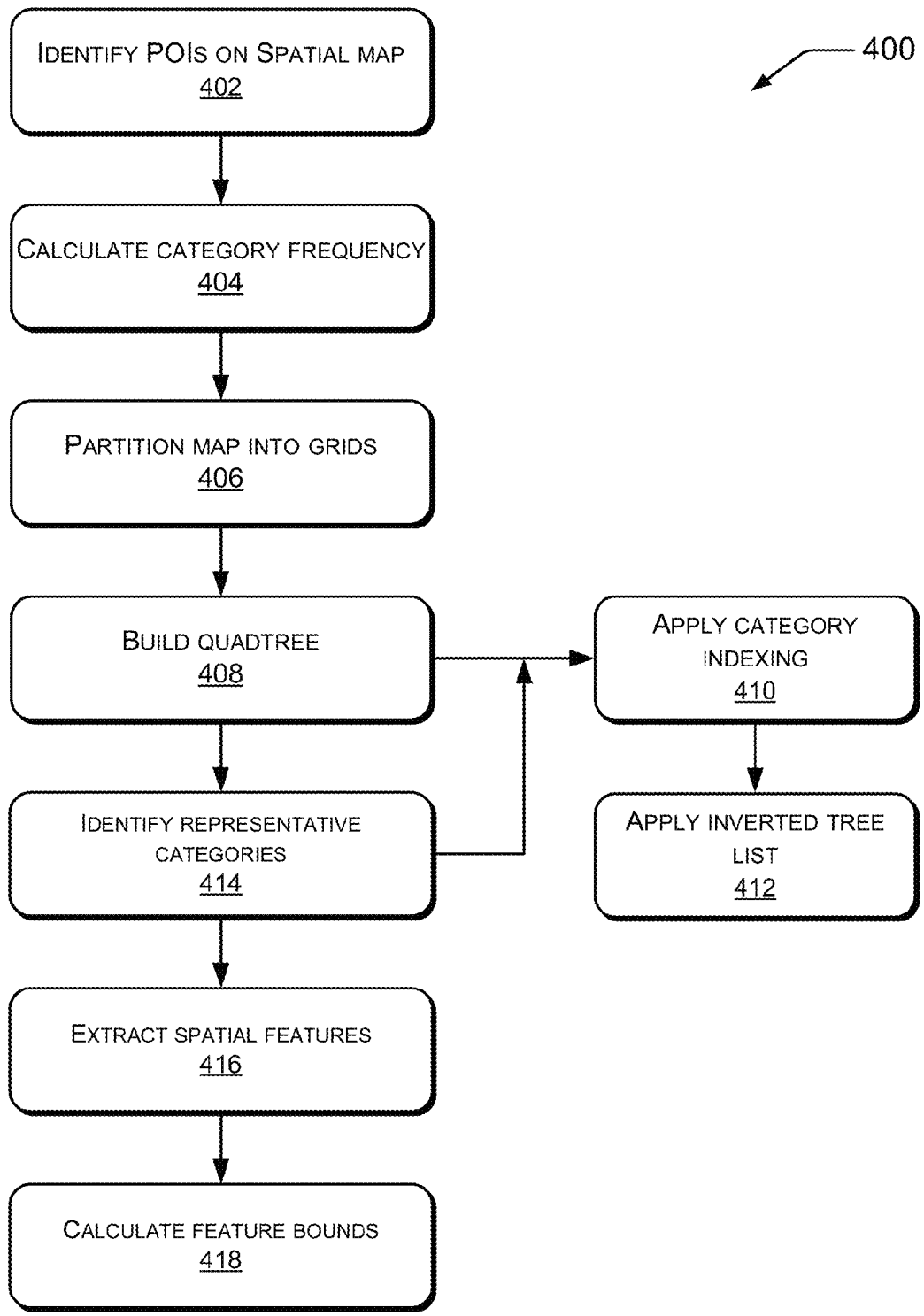
FIG. 4 is a flowchart showing an illustrative process identifying POIs with representative categories in geographical regions.
Figure 8:
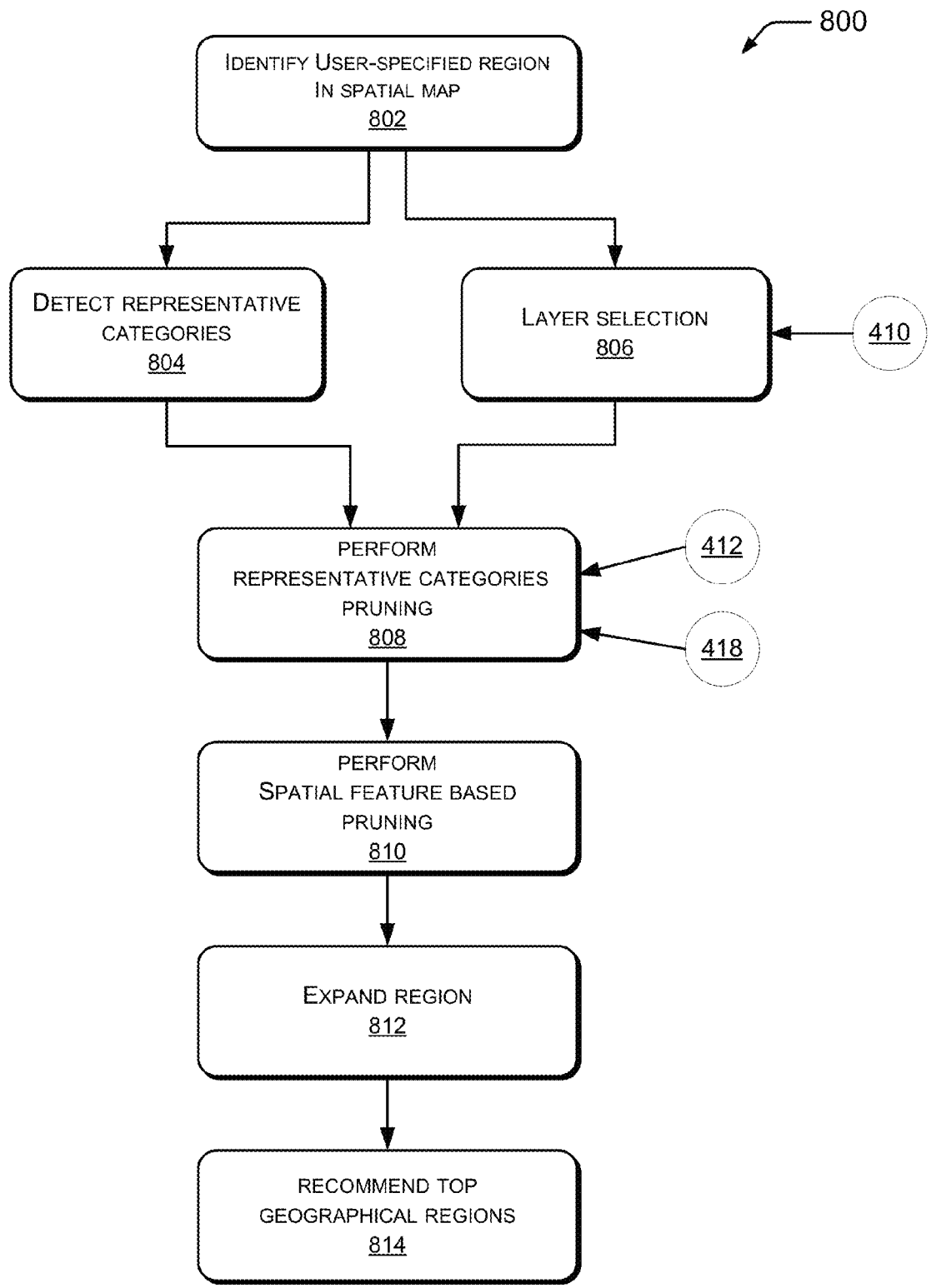
FIG. 8 is a flowchart showing an illustrative process of searching and recommending top geographical regions with similar measures of content to the user-specified region.

FIGS. 4 and 8 are flowcharts showing illustrative processes for performing a search for geographical regions with POIs that are similar to a user-specified region. FIG. 4 is a flowchart based on at least in part on identifying the POIs, building a quadtree, and identifying the representative categories. FIG. 8 is a flowchart based on at least in part on a user-specified region, performing representative categories pruning and spatial feature pruning, and recommending the top geographical regions with similar POIs. The processes are illustrated as a collection of blocks in logical flowcharts, which represent a sequence of operations that can be implemented in hardware, software, or a combination. For discussion purposes, the processes are described with reference to the computing environment 100 shown in FIG. 1, the computing device 102 shown in FIG. 2, and/or the geographical region server 114 shown in FIG. 3. However, the processes may be performed using different environments and devices. Moreover, the environments and devices described herein may be used to perform different processes.

For ease of understanding, the methods 400 and 800 are delineated as separate steps represented as independent blocks in FIGS. 4 and 8. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps will be omitted.

FIG. 4 is a flowchart 400 based on at least in part on identifying the POIs, building a quadtree, and identifying the representative categories. As shown in 402, the process 400 identifies POIs on the spatial map from POIs database. The POIs database may use information retrieved from including but not limited to: published telephone information with categories, zip code information, area code information, and the like. The entities in the POIs database that are within the query region are processed. The process may check the global position satellite (GPS) positions of each entities.

Equations used for the process are described below. An equation illustrates the search functionality and recommends geographical regions with similar content information. Using the spatial map, a query region Rq, two coefficients to control an area of a region u1 and u2, the process finds the top-k most similar regions to Rq on the spatial map. The equation to find the area Ri is:

$$\mu_1 \leq \frac{\text{Area}(R_i)}{\text{Area}(R_q)} \leq \mu_2.$$

Ri is a return region or in a set of candidates and that any two regions do not have a large overlap. An expected size of returned similar regions may satisfy the following inequality: 41 a*size of original region=<size of returned region<=b*size of original region. For example, a may be 0.7, b may be 1.3. These parameters may ensure the size of the returned regions are similar to the query region.

In an equation, P is the spatial map, and T is a set of POI categories, such that T={$C_1, C_2, \ldots C_K$}. Each POI may be labeled with multiple POI categories. For example, a building is labeled both as a cinema and a restaurant, if the building houses a cinema and has at least one restaurant inside.

In another equation, the POI database D is a set of POIs. Each POI, o in D is presented by a tuple o=$\langle p_o; T_o \rangle$, where $p_o=(x_o, y_o)$ denotes the location of o, and $T_o$ is the set of o's POI categories. The process uses $|C_i|$ to denote the number of POI tuples with category $C_i$. Thus the number of POI tuples with category may be represented as:

$|C_i|=|\{o|\Gamma_o \epsilon C_i\}|$

A region R∈P is a spatial rectangle bounded by [$Rx_{min}$, $Rx_{max}$]×[$Ry_{min}$, $Ry_{max}$] A POI o=$\langle p_o; \Gamma_o \rangle$ is believed to have occurred in region R if $p_o \epsilon R D_i^K=\{o|p_o \epsilon R^\wedge \Gamma_o \epsilon C_i\}$ is a set of objects with category Ci occurring in region R.

In block 404, the process calculates the Category Frequency (CF) of the category Ci in region Rj, may be denoted as $CF_{i,j}$. This is the fraction of the number of POIs with category Ci occurring in region Rj to the total number of POIs in region Rj, shown as:

$$CF_{i,j} = \frac{n_{i,j}}{\sum_{p=1}^{K} n_{p,j}}$$

where $n_{i,j}$ is the points number of category $C_i$ in region $R_j$. The relevance of a category Ci depends on the distribution of POIs with category Ci on the entire map. These equations are used to identify the category frequency of the category in the region.

In block 406, the process partitions the spatial map into grids (or regions) by imposing a $g_x \times g_y$ grid on the spatial map. The Inverse Region Frequency (IRF) of category Ci, may be denoted as IRFi. The IRF is a logarithm of a fraction of a total number of grids to a number of grids that contain POIs with category Ci. Shown is the equation for Inverse Region Frequency as:

$$IRF_i = \log \frac{g_x \times g_y}{|\{D_i^{R_j} | D_i^{R_j} \neq \emptyset\}|}.$$

With CF and IRF calculated, the significance of a category $C_i$, in region $R_j$, may be denoted as $CF\text{-}IRF_{i,j}$. This equation identifies the representative categories by:

$$CF\text{-}IRF_{i,j} = CF_{i,j} \times IRF_i$$

Furthermore, a CFIRF vector space model represents each region by a set of representative categories' CFIRF values. The information content of a candidate region, Ri and the query region, Rq, may be represented by vectors. The vector representations may be shown as:

$$\vec{R_i} = (w_{1,i}, w_{2,i}, \ldots, w_{K,i})$$

$$\vec{R_q} = (w_{1,q}, w_{2,q}, \ldots, w_{K,q})$$

where $w_{k,i}$ and $w_{k,q}$ are the CFIRF feature values of category $C_k$ in regions Ri and Rq, respectively. Furthermore, ω=CF−IRF may be used.

The CF-IRF identifies the representative categories of a region including the query region and grid regions to be searched. When identifying the representative categories of the query region, the process determines a corresponding level of the quad-tree where the query should be searched. After the quadtree level is determined, the number of grids on the level is known and the CF-IRF may be calculated. The top m categories with relatively large CF-IRF values may be selected as the representative categories, where m is a predefined parameter.

The information content similarity of two regions, Ri and Rj, is the cosine similarity of the corresponding feature vectors of Ri and Rj. The spatial vector space model (SVSM) ranks the regions according to their cosine similarity measures, described as:

$$Sim(R_i, R_j) = \cos(\vec{R_i}, \vec{R_j}) = \frac{\vec{R_i} \cdot \vec{R_j}}{|\vec{R_i}| \times |\vec{R_j}|}.$$

Using the equation shown above, the vector space model regards regions having similar CFIRF category values to be similar and ranks the regions according to their cosine similarity measures.

In block 408, after partitioning the spatial map of this database, the process builds a hierarchical quadtree structure to facilitate the construction of multi-scale regions. In the quadtree, the root node denotes the map and each non-leaf node corresponds to one of the four partitioned cells from its parent's cell. At the lowest level, each leaf node corresponds to the partitioned cell with the smallest granularity.

The quadtree structure enables the efficient handling of multi-granularity similar region queries. This is because the process may adaptively select the different levels of granularity by accessing the quadtree nodes at an appropriate level.

From the quadtree 408, the process moves to the right to apply category indexing as shown in block 410. Category indexing may be used to conducting a search by indexing a particular category. This may be used as input for a layer selection in FIG. 8. From here, the process proceeds to block 412.

In block 412, the process constructs an inverted tree index on the representative categories to facilitate similar region search. The root node of the inverted tree has K entries, where each entry corresponds to a category. Each category, say Ci, of a non-leaf node is associated with a child node that has four entries. The entry value is 1 if the corresponding partitioned region has the Ci as a representative category; otherwise the entry value will be 0. This inverted list tree is recursively built until it reaches a leaf node of the quadtree structure or all four entries have value 0. Based on this inverted tree index, the process may quickly identify the cells that have similar categories to the query region. The inverted tree 412 is used as input for category-based pruning in FIG. 8.

In block 414, the process identifies representative categories of a region for the query region and grid regions to be searched. Based on determining the number of grids in the level described above, the process moves to identify whether these are representative categories. The process determines the corresponding level of quad-tree where the geographical regions should be searched. Once this level of quad-tree is determined, the number of grids on each level is known to calculate the CF-IRF.

In block 416, the process extracts spatial features from the representative categories. The process allows effective region pruning by storing the key statistical information at each node in the quadtree. Each node maintains the lower bound and upper bound of feature entries. The feature entries are defined as the lower bound feature vector of a node B, denoted as Blb, is (f1, lb, f2, lb, . . . fn, lb), where fi,lb is the minimum i-th feature entry of all descendant nodes of B. The upper bound feature vector of a node B, denoted as Bub, is (f1, ub, f2, ub, . . . fn, ub) where fi, ub is the maximum i-th feature value of all descendant nodes of B.

Depending on the similarity measure that is adopted, the bounds may be one of the following:
  min(Ci)/max(Ci): The minimum/maximum number of POIs of category Ci in the region corresponding to node B;
  min(h(Ci; Cj))/max(h(Ci; Cj)): The minimum/maximum mutual distance of category pair Ci and Cj in the region corresponding to node B;
  min(Ii)/max(Ii): The minimum/maximum reference distance vector of representative categories in the region corresponding to node B;
These bounds are useful for pruning the candidate regions as stated in Lemma 1 shown below.

Lemma 1: Let $\vec{R_q} = (f_{1,q}, f_{2,q}, \ldots, f_{n,q})$ to be the feature vector of query region, σ to be the cosine similarity threshold of top-k regions. A node B can be pruned if for any feature entry $f_{i,q}$ there is $$f_{i,ub} \cdot f_{i,q} \leq \frac{\delta}{n} \cdot |\vec{B_{lb}}| \cdot |\vec{R_q}|.$$

Proof: Let $f_{i,j}$ to be the i-th feature entry of region $R_j$ where $R_i \in B$. Then $f_{i,lb} \le f_{i,j} \le f_{i,ub}$ and $|\vec{B}_{lb}| \le |\vec{R}_j| \le |\vec{B}_{ub}|$. Assume that:

$$f_{i,ub} \cdot f_{i,q} \le \frac{\delta}{n} \cdot |\vec{B}_{lb}| \cdot |\vec{R}_q|.$$

For the i-th feature entry $f_{i,j}$, the process has $$f_{i,j} \cdot f_{i,q} \le f_{i,ub} \cdot f_{i,q} \le \frac{\delta}{n} \cdot |\vec{B}_{lb}| \cdot |\vec{R}_q| \le \frac{\delta}{n} \cdot |\vec{R}_j| \cdot |\vec{R}_q|.$$

By summing up the inequalities, the process shows:

$$\vec{R}_j \cdot \vec{R}_q = \sum_{p=1}^{n} f_{p,j} f_{p,q} \le \sigma \cdot |\vec{R}_j| \cdot |\vec{R}_q|.$$

Based on this, $\cos(\vec{R}_j, \vec{R}_q) \le \sigma$, which means that any region $R_j$ under B will not have a larger similarity than the top-k region similarity threshold.

With Lemma 1, the process may prune all node B that have no chance of satisfying the similarity threshold $\sigma$. For example, suppose the quadtree node B has four child nodes, B1, B2, B3, and B4. Each feature vector of child node has five entries.

$\vec{B}_1 = (0.1, 0.3, 0.1, 0.8, 0.0)$ $\vec{B}_2 = (0.1, 0.7, 0.2, 0.7, 0.0)$ $\vec{B}_3 = (0.0, 0.3, 0.1, 0.8, 0.2)$ $\vec{B}_4 = (0.2, 0.4, 0.2, 0.6, 0.1)$ The process has $\vec{B}_{lb} = (0.0, 0.3, 0.1, 0.6, 0.0)$ and $\vec{B}_{ub} = (0.2, 0.7, 0.2, 0.8, 0.2)$. Let the feature vector of query region is $\vec{R}_q = (0.9, 0.1, 0.9, 0.1, 0.8)$ and $\delta = 0.95$. The result is $$\frac{\delta}{n} \cdot |\vec{B}_{lb}| \cdot |\vec{R}_q| = 0.2468.$$

Thus, the node B can be pruned because each feature entry product of $\vec{R}_q$ and $\vec{B}_{ub}$ is less than 0.2468.

Block 418 calculates feature bounds which helps speed up the search. Once the feature bounds are identified, this may be applied in category-based pruning in FIG. 8.

Figure 5:
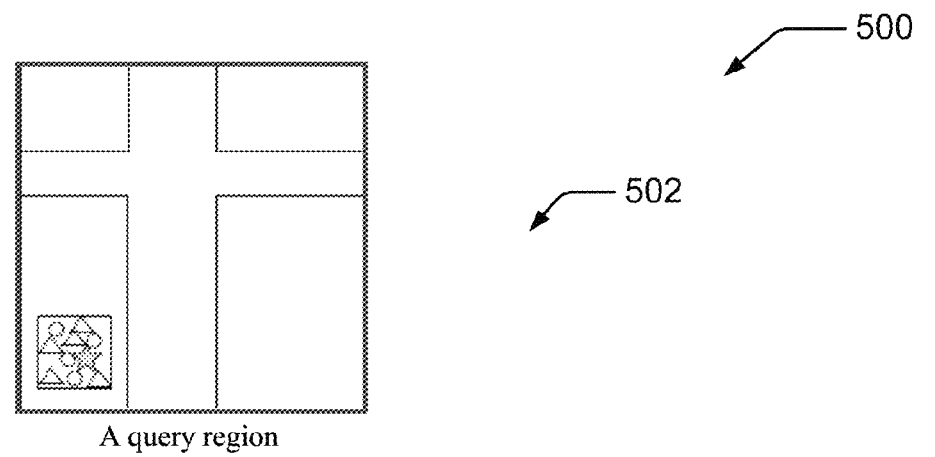
FIG. 5 is a schematic showing illustrative spatial distributions of POIs with representative categories.
Figure 5:
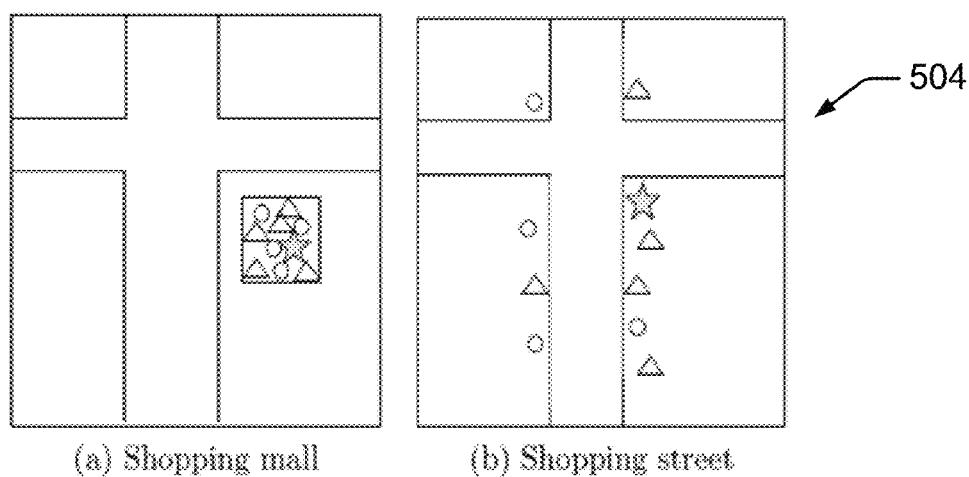
Figure 5:
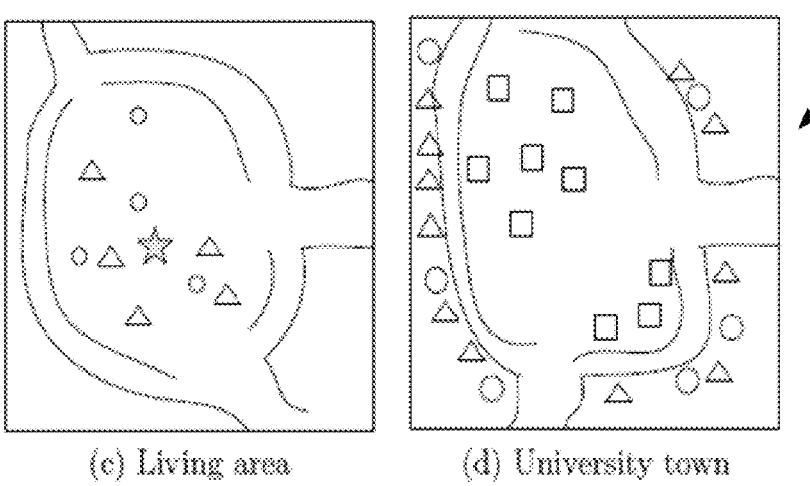

FIG. 5 is a schematic showing illustrative spatial distributions with representative categories 500. The illustrations 500 represent geometric properties (i.e., scales and shapes), content properties (i.e., POIs categories and representative categories), and spatial properties (i.e., distribution of POIs of representative categories and reference points). As mentioned previously, similarity measure determines whether the regions are similar.

In this implementation, restaurants may be represented by triangles, stores may be represented by circles, and theatres may be represented by stars. An example of a query region is shown in 502 with restaurants, stores, and a theatre closely distributed.

Shown along 504 are spatial distributions of restaurants, stores, and theatres in a) a shopping mall and b) a shopping street. This illustrates common representative categories of restaurants, stores, and theatres. However, the two illustrations show different scales, such as a small scale for the shopping mall while a large scale for the shipping street. Furthermore, the spatial distributions of the shopping mall and the shopping street are very different as the distributions of the POIs for each category are drastically different in the two figures. Thus, the shopping mall and the shopping street are not similar. However, the shopping mall is similar to the query region 502 and would be selected as having common representative categories, common size and scale, and common spatial distributions.

Shown along 506 are spatial distributions of restaurants, stores, and theatres in a c) living area and in an d) university town. This illustrates the living area and the university town are not similar because the overlap in their common categories is only 2 out of 3. The common categories are restaurants represented by triangles and stores represented by circles. There are no theatres represented by stars but includes rectangles. Furthermore, there are different shapes, the living area is in a small rectangle while the university town would include multiple rectangles. These spatial distributions of the POIs corresponding to the representative categories may be differentiated by the spatial vector space model. To minimize the effects of scaling and to allow for rotation invariant, the process uses two features to capture the spatial distributions of these POIs: mutual distance vector and reference distance vector.

Figure 6A:
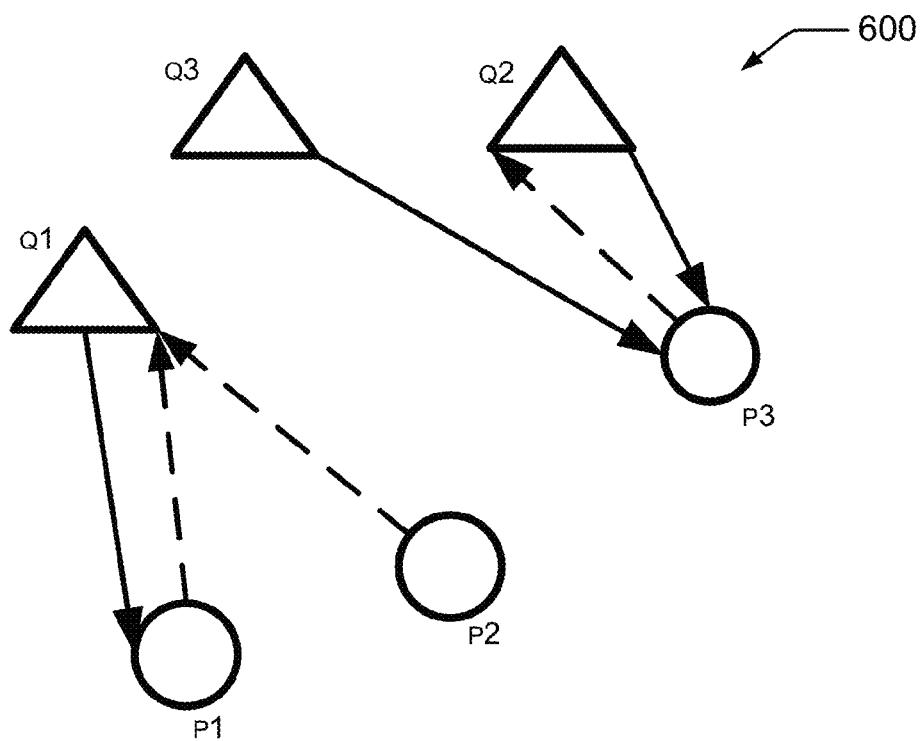
FIG. 6a is a diagram showing illustrative mutual distance vectors.

FIG. 6a is a diagram showing illustrative mutual distance vectors 600. The mutual distance vector 600 represents a mutual distance between two sets of POIs, P and Q. The mutual distance between P and Q is an average distance of all the points in P to the nearest point of Q. Vectors 600 show the nearest neighbor distances from P to Q (shown in dash lines), such as P1 to Q1, P2 to Q1, and P3 to Q2. Vectors 600 also show the nearest neighbor distances from Q to P (shown in solid lines), such as Q1 to P1, Q3 to P3, and Q2 to P3. In this example, the mutual distance h(P; Q) is the average distance of dash lines and h(Q; P) is the average distance of solid lines.

Shown below is an equation to measure the mutual distance of h(P; Q)

$$h(P, Q) = \frac{1}{|P|} \sum_{p \in P} \min_{q \in Q} dist(p, q)$$

where dist(p, q) is the Euclidean distance function.

A small mutual distance of h(P; Q) means that all the POIs in sets P and Q are close. The mutual distance is also consistent with the Hausdorff distance, which is a widely used distance function in pattern recognition.

A region R can be characterized by the mutual distances among the sets of POIs in R. Given K number of representative categories, R can be represented as a vector of K2 entries, denoted as $\vec{H}_R = (h_{11}, h_{12}, \ldots, h_{1K}, \ldots, h_{KK})$, where hij is the mutual distance of the set of POIs in R with category Ci to the set of POIs in R with category Cj.

Note that the mutual distance is an asymmetric metric, i.e. $h(P,Q) \ne h(Q, P)$. The process may also measure the closeness within a set of POIs of the same category, say $P = (p_1, p_2, \ldots p_m)$ as follows:

$$h(P, P) = \frac{1}{|P|} \sum_{p_i \in P} \min_{p_j \in P, j \ne i} dist(p_i, q_j)$$

As mentioned above, a small mutual distance of h (P; P) implies that the POIs of P are close to each other. On the other hand, a large h(P; P) means that the POIs of P have a sparse distribution.

While the mutual distance vector 600 accurately captures the spatial distribution among the POIs of different categories in a region R, it has been observed that most users tend to use some reference points for determining region similarity. With this in mind, the process captures the spatial distributions of the POIs with respect to a set of reference points. This is based on the observation that users usually compare the distribution by the distances between the POIs and the region icons or corners.

Figure 6B:
FIG. 6b is a diagram showing illustrative reference distance vectors.

FIG. 6b is a diagram showing illustrative reference distance vectors 602. Shown are five reference points, O1, O2, O3, O4, O5, four corners, and the center, as the reference set. FIG. 6B illustrates the five reference points and the distances of two POIs, P and Q, to the reference set.

The similarity of regions is determined by the similarity of feature vector sets. Given two regions Ri and Rj and their feature vector sets $\vec{IR_i} = \{\vec{I_{1,i}}, \ldots \vec{I_{C,i}}\}$ and $\vec{IR_j} = \{\vec{I_{1,j}}, \ldots \vec{I_{C,j}}\}$, the similarity is computed by selecting the best similar feature vector from $\vec{IR_j}$ for each feature vector in $\vec{IR_i}$, and compute the average similarity value. The reference distance is an average distance of all the points in P/Q to each of the reference points. Given a region R, a set of POIs P, and a set of reference points O={O1, O2, O3, . . . Oc}. The distance of P to the i-th reference point $o_i \in O$ is measured by:

$$r(P, o_i) = \frac{1}{|P|} \sum_{p \in P} dist(p, o_i).$$

Assume region R has K different categories of POIs. The process uses $r_{i,j}$ to denote the distance of POIs with category Ci to the reference point Oi. The distance of K categories to the reference point Oi is a vector of K entries, shown below:

$$\vec{I_i} = (r_{1,i}, r_{2,i}, \ldots, r_{K,i}).$$

The distance of K categories to the reference set O is a set of vectors, shown as:

$$I = (\vec{I_1} \ldots \vec{I_C})$$

The selection of reference points is application dependent. The process may need at least reference points to uniquely determine a position on the spatial plane. The larger number of reference points will give a more accurate representation of the spatial distributions among the POIs, while incurring more computational cost.

Figure 7:
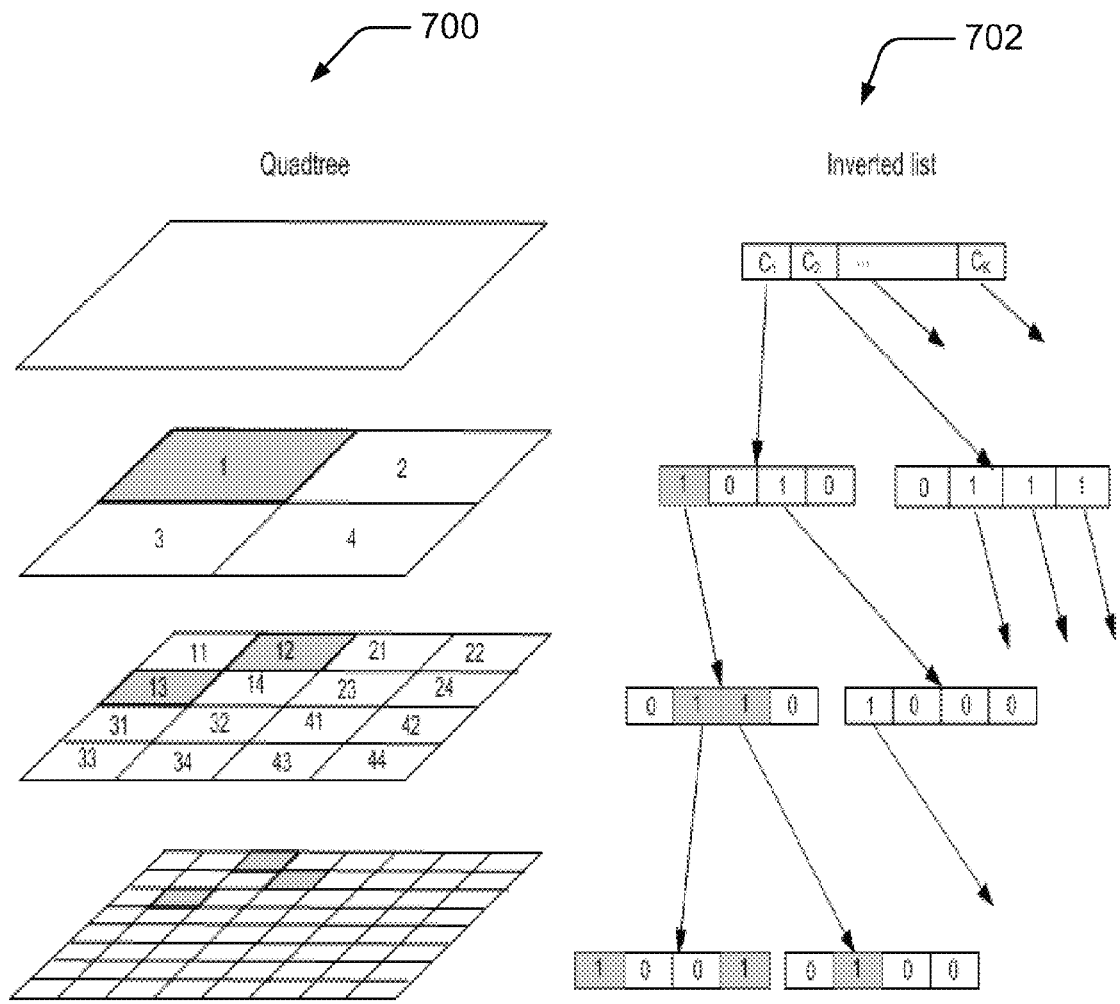
FIG. 7 is a schematic showing an illustrative quadtree and an inverted list.

FIG. 7 illustrates an exemplary quadtree 700 and an exemplary inverted list 702 for a process similar to the one described FIG. 4. The quadtree 700 and the inverted list 704 partitions geographical spaces into grids based on the quadtree. Each quadtree node stores the features bound of its four adjacent children. The feature bound is calculated in a bottom-up manner.

For example, the shadowed areas in the quadtree 700 correspond to the shadowed nodes in the inverted list 702. In the first level, shadow area 1 in quadtree 700 corresponds to the shadow area 1 in the inverted list 702. In the second level, shadow areas 12 and 13 in the quadtree 700 corresponds to 1,1 in the inverted list 702.

A search strategy is described based on the quadtree structure. Given a query region, the process adjusts the search granularity on the quadtree based on the query region by accessing the lowest level of the quadtree. The lowest level of the quadtree has an area that is greater than $\mu_1 \times area(R_q)$.

An algorithm, algorithm 1 is shown below to give an illustration of the region search. The purpose is to select a bucket of level lsearch in the quadtree as a seed and gradually expand this bucket to a region of suitable shape and large similarity value.

```
Algorithm 1: Region Search (R_q, T, s, k)
    Input: Query region R_q;
           Quadtree T;
           Number of return regions s;
           Number of representative categories m.
    Output: Top-k similar regions
 1 Compute the search level l_search on T based on R_q;
 2 CM = ExtractCategory(R_q);
 3 Adjust (R⃗_q, CM);
 4 R = ∅;
 5 δ = 0;
 6 SearchQTree(R⃗_q, T.root, δ, R);
 7 return R;
 8 Procedure SearchQTree(R⃗_q, B, δ, R, CM);
 9 if B has CM categories ∧ B cannot be pruned by
       Lemma 1 then
10     If B.level < l_search then
11         for each child node (B' ∈ B) do
12             SearchQTree (R_q, B', δ, R)
13     else
14         R =RegionExpansion(R_q, B')
15         R = R ∪ R;
16         update δ;
17 Function RegionExpansion (R_q, R)
18 repeat
19     for each dir ∈ {LEFT, RIGHT, DOWN, UP} do
20         R" =expand(R,dir);
21         dir = arcmax(Sim(R_q, R"))
22     R' =expand(R,dir);
23 until Sim(R_q, R) ≤ Sim(((R_q,R');
24 return R'
```

Line 1 computes the proper search level on the quadtree T. The bucket of search level will be greater than the minimal area of returned regions. Line 2 extracts the representative categories from the search region Rq. The function ExtractCategory computes the CFIRF values for each category on Rq and only maintains the top-m categories with the largest CFIRF values. Line 3 adjusts the feature vector of Rq. If the feature vectors are category CFIRF vectors or reference feature vectors, the entries which correspond to the top-m representative categories remains and the other entries are set to be zero. If the feature vector are mutual influence feature vector, the entries which correspond to the top-m representative category pairs remain and the other entries are set to zero.

Line 4 and Line 5 initialize the return region set to be an empty set and the similarity threshold δ to be 0. Line 6 calls procedure SearchQTree to find and to prune the candidate regions. Line 9 of Algorithm 1 is the validity checking for the top-k regions. A bucket is valid only if 1) it contains the CM representative categories, and 2) it cannot be pruned by Lemma 1. The inverted tree structure and the feature bounds of buckets facilitate the validity checking. If a bucket is valid, this bucket may contain at least one top-k similar region, which means that its child nodes need to be processed further.

Line 13 recursively calls the procedure to process the child node if has a depth less than lsearch. Otherwise, the process may stop at the level of lsearch because the buckets at the lower levels are too small to be candidate regions. Line 14 expands the bucket of lsearch by calling the function RegionExpansion. Line 15 inserts the expanded region R to the top-k region set R. If R has no overlap with the existing top-k regions, R is inserted into R. Note that R only maintains k regions which have the largest cosine similarity values. Line 16 updates the similarity threshold±based on k-th largest similarity value in R.

Lines 17-24, the RegionExpansion function treats a region as a seed and tries to expand the seed in four candidate directions, and selects the optimal expanded region which give the largest similarity value. The step width of each expansion is the cell side of the quadtree leaf node in order to minimize the scope of expansion, which eventually approach the local most similar region. The expansion is repeatedly performed till there is no increase in the similarity value (Line 23). Finally, Line 7 returns the top-k regions. If the number of regions in R is less than k, the process may decrease the value of m by 1 in Line 9, and search the cells which share exact $m_i1$ common representative categories and do not pruned by Lemma 1. The process repeatedly decreases the m value by 1 till the number of return regions in R reaches k.

FIG. 8 is a flowchart illustrating an exemplary process 800 of searching to recommend the geographical regions having the top similar scores from the set of candidates that are similar to the user-specified region. To search and to provide recommendations of geographical regions with similar POIs to the user-specified region, the process looks for properties that are similar. The process measures properties based on at least on geometric properties (i.e., scales and shapes), content properties (i.e., POI categories and representative categories), and spatial properties (i.e., distribution of POIs of representative categories and reference points).

At block 802, the query region or the user-specified region is identified or selected by the user 106, by highlighting the query region on the spatial map. In an implementation, the user 106 may specify the POIs by drawing a rectangle around the query region on the spatial map. The region highlighted within the rectangle is the user-specified region or the query region. For example, the user is travelling in Seattle, Wash., accesses the spatial map for Seattle, and selects sights or attractions specific to the Seattle region, such as the Space Needle. The user-specified region with the POI is the Space Needle, which may be highlighted by a red color rectangle. The process may retrieve similar POIs in the geographic region on the spatial map, identifying the geographical regions with the top most similar scores. The process searches and recommends sights or attractions specific to the Seattle region, such as the Pike Place Market, the Waterfront, the Woodland Park Zoo, the Seattle Art Museum, and the like. The POIs in the geographical region that are similar in content to the POIs in the user-specified region may be shown with blue lines around them.

In block 804, the process detects the representative categories based on using the equations described above in 404 and 406 to calculate category frequency CF, inverse region frequency IRF, and significance of a category in a region CF-IRF. For convenience, the equations are reproduced below:

$$CF_{i,j} = \frac{n_{i,j}}{\sum_{p=1}^{K} n_{p,j}}$$

-continued $$IRF_i = \log \frac{g_x \times g_y}{|\{D_i^{R_j} | D_i^{R_j} \neq \emptyset\}|}$$

And $$CF - IRF_{i,j} = CF_{i,j} \times IRF_i$$

In block 806, a layer selection receives input from the category indexing 410. The layer selection 806 analyzes a shape and a size of the user-specified region and determines an appropriate quadtree layer to initiate the similar region search process. During this time, the process computes the CFIRF values to derive the representative categories of the user-specified region. Thus, the layer selection 806 identifies the quadtree layer based on the information received from the user-specified region and the category index information. Once the starting level of the quadtree and the representative categories of the user-specified region are known, a prune-and-refine procedure may reduce the search space that is not likely to be in the top-k most similar geographical regions.

Turning to block 808, the process performs representative categories pruning on the set of candidates. Representative category-based pruning includes receiving input of the representative categories and information from the quadtree layer along with content received from the inverted tree list 412 and feature bounds 418. The category-based pruning determines there is some overlap of representative categories with the user-specified region.

The process performs category-based pruning 808 on the set of candidates. For example, a candidate region may have some overlaps of representative categories with the query region. An equation to determine overlap based at least in part on cosine similarity. For pruning, the cosine similarity should exceed a threshold, as shown in the equation below:

$$\text{Cosine}(\vec{R_j}, \vec{R_q}) = \frac{\vec{R_j} \cdot \vec{R_q}}{\|R_j\| \times \|R_q\|} < \delta$$

Block 810 performs spatial feature-based pruning. For spatial feature-based pruning 810, the equations to consider are:

$$\text{Cosine}(\vec{h_j}, \vec{h_q}) = \frac{\vec{h_j} \cdot \vec{h_q}}{\|\vec{h_j}\| \times \|\vec{h_q}\|} < \delta$$

$$\text{Cosine}(\vec{l_j}, \vec{l_q}) = \frac{\vec{l_j} \cdot \vec{l_q}}{\|\vec{l_j}\| \times \|\vec{l_q}\|} < \delta.$$

As mentioned earlier, the pruning process may be sped up based on Lemma 1. For brevity, Lemma 1 will not be reproduced here but the discussion follows as discussed in 416.

Block 812 expands the region. The process selects the seeds regions that do not need to be pruned. The process expands the seed regions using the functionality shown below:

```
Function RegionExpansion (R_q R)

repeat
    foreach dir ∈ {LEFT, RIGHT, DOWN, UP} do
        R" =expand(R, dir);
        dir = arcmax(Sim(Rq,R"));
        R' = expand(R, dir);
    until Sim(R_q,R)≤Sim(R_q,R');
return R'
```

Block 814 provides recommendations for the top ranking geographical regions that have similar content information to the user-specified region.

In another implementation, the user may specify an area that is considered an area identified for a particular disease. Based on the user-specified area for this area, the process may identify the areas that are prone to the particular disease. Thus, travelers may desire to avoid areas that may be prone to this particular disease or potential to breakouts.

As discussed above, certain acts in processes 400 and 800 need not be performed in the order described, may be modified and/or may be omitted entirely, depending on the circumstances. Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented at least partially by one or more processors, the method comprising:
    providing a spatial map containing geographical regions partitioned into grids;
    identifying a user-specified region with a first plurality of points of interests in each of one or more representative categories in the spatial map;
    searching for a set of geographical region candidates with a second plurality of points of interests in each of the one or more representative categories based at least in part on a spatial similarity to comparable points of interest in the one or more representative categories in the user-specified region, the spatial similarity comprises comparable distribution of respective points of interests of the user-specified region and the set of geographical region candidates in the one or more representative categories; and
    presenting a predefined number of top geographical region candidates of the set of geographical region candidates based at least in part on a result of the searching.

2. The method of claim 1, further comprising pruning plurality of of geographical region candidates to create the set of geographical region candidates before the searching.

3. The method of claim 2, wherein the pruning comprises:
    calculating frequencies of one or more categories within each region of the spatial map;
    calculating an inverse region frequency of the one or more categories within each region based at least in part on a total number of the grids within the respective region that include points of interest with the respective category;
    identifying the representative categories of each region based at least in part on the calculated frequencies of the one or more categories and the inverse region frequency of the one or more categories;
    extracting spatial features from the representative categories based at least in part on the identified representative categories; and
    calculating bounds of non-extracted spatial features from the representative categories,
    wherein the pruning is based at least in part on the bounds of the non-extracted spatial features.

4. The method of claim 3, wherein the calculating the frequencies of the one or more categories comprises determining a category frequency value for a first category of the one or more categories within a first region of the geographical regions based at least in part on a ratio of a number of points of interest for the first category in the first region to a total number of points of interest in the first region.

5. The method of claim 3, wherein the calculating the bounds comprises determining a ratio of a minimum number of points of interest of a first category of the representative categories in a first region of the geographical regions to a maximum number of points of interest of the first category in the first region.

6. The method of claim 3, wherein the calculating the bounds comprises determining a ratio of a minimum distance between a pair of the representative categories in a first region of the geographical regions to a maximum distance between the pair of the representative categories in the first region.

7. The method of claim 3, wherein the calculating the bounds comprises determining a ratio of a minimum reference distance vector for a pair of the representative categories in a first region of the geographical regions to a maximum reference distance vector for the pair of the representative categories in the first region.

8. The method of claim 1, wherein the providing the spatial map comprises creating a hierarchical structure with a root node denoting one of the geographical regions and imposing the grids on the spatial map to correspond to partitioned cells from a parent's cell.

9. The method of claim 8, wherein the identifying representative categories comprises identifying the representative categories for the user-specified region and the grids used by the searching based at least in part on the hierarchical structure.

10. A system comprising:
    a memory;
    one or more processors coupled to the memory to perform acts comprising:
        providing a spatial map containing geographical regions partitioned into grids;
        identifying a user-specified region with a first plurality of points of interests in each of one or more representative categories in the spatial map;

extracting one or more geographical region candidates from a set of geographical region candidates;

searching the extracted set of geographical region candidates with a second plurality of points of interests in each of the one or more representative categories based at least in part on a spatial similarity to comparable points of interest in the one or more representative categories in the user-specified region, the spatial similarity comprises comparable distribution of respective points of interests of the user-specified region and the set of geographical region candidates in the one or more representative categories; and presenting a predefined number of top geographical region candidates based at least in part on a result of the searching.

11. The system of claim 10, wherein the extracting comprises:

calculating frequencies of one or more categories within each region of the spatial map;

calculating an inverse region frequency of the one or more categories within each region based at least in part on a total number of the grids within the respective region that include points of interest with the respective category;

identifying the representative categories of each region based at least in part on the calculated frequencies of the one or more categories and the inverse region frequency of the one or more categories;

extracting spatial features from the representative categories based at least in part on the identified representative categories; and calculating one or more bounds of non-extracted spatial features from the representative categories, wherein the extracting the one or more geographical region candidates is based at least in part on the one or more bounds of the non-extracted spatial features.

12. The system of claim 11, wherein the calculating the frequencies of the categories comprises determining a category frequency value for a first category of the one or more categories within a first region of the geographical regions based at least in part on a ratio of a number of points of interest for the first category in the first region to a total number of points of interest in the first region.

13. The system of claim 11, wherein the calculating the one or more bounds comprises determining a ratio of a minimum number of points of interest of a first category of the representative categories in a first region of the geographical regions to a maximum number of points of interest of the first category in the first region.

14. The system of claim 11, wherein the calculating the one or more bounds comprises determining a ratio of a minimum distance between a pair of the representative categories in a first region of the geographical regions to a maximum distance between the pair of the representative categories in the first region.

15. The system of claim 11, wherein the calculating the one or more bounds comprises determining a ratio of a minimum reference distance vector for a pair of the representative categories in a first region of the geographical regions to a maximum reference distance vector for the pair of the representative categories in the first region.

16. The system of claim 11, wherein the providing the spatial map comprises building a quadtree structure with a root node denoting a region and imposing grids on the spatial map to correspond to partitioned cells from a parent's cell.

17. The system of claim 16, wherein the identifying the representative categories comprises identifying the representative categories for a query region and each of the grids to be searched based at least in part on the quadtree structure.

18. The system of claim 16, wherein the identifying the representative categories comprises identifying the representative categories for a query region and each of the grids to be searched based at least in part on an inverted tree list.

19. A computing device comprising:

one or more processors;

a computer-readable storage medium in communication with the one or more processors, the computer-readable storage medium having computer-executable instructions that, when executed, cause the one or more processors to perform acts comprising:

providing a spatial map containing geographical regions partitioned into grids;

identifying a user-specified region with a first plurality of points of interests in each of one or more representative categories in the spatial map;

pruning a set of geographical region candidates;

searching from the pruned set of geographical region candidates for geographical region candidates having a second plurality of points of interests in each of the one or more representative categories based at least in part on a spatial similarity to comparable points of interest in the one or more representative categories of the user specified region, the spatial similarity comprises comparable distribution of respective points of interests of the user-specified region and the set of geographical region candidates in the representative categories; and presenting a predefined number of top geographical region candidates based at least in part on a result of the searching.

20. The computing device of claim 19, wherein the pruning comprises:

calculating frequencies of one or more categories within each region of the spatial map;

calculating an inverse region frequency of the one or more categories within each region based at least in part on a total number of the grids within the respective region that include points of interest with the respective category;

identifying the representative categories of each region based at least in part on the calculated frequencies of the one or more categories and the inverse region frequency of the one or more categories;

extracting spatial features from the representative categories based at least in part on the identified representative categories; and calculating one or more bounds of non-extracted spatial features from the representative categories, wherein the pruning is based at least in part on the one or more bounds of the non-extracted spatial features.

* * * * *